US011981119B2

(12) United States Patent
Yamazaki

(10) Patent No.: US 11,981,119 B2
(45) Date of Patent: May 14, 2024

(54) METHOD AND APPARATUS FOR CONTROLLING INK EJECTION

(71) Applicant: RISO KAGAKU CORPORATION, Tokyo (JP)

(72) Inventor: Takahisa Yamazaki, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 202 days.

(21) Appl. No.: 17/837,495

(22) Filed: Jun. 10, 2022

(65) Prior Publication Data

US 2022/0410590 A1 Dec. 29, 2022

(30) Foreign Application Priority Data

Jun. 29, 2021 (JP) ................................. 2021-107730

(51) Int. Cl.
*B41J 11/00* (2006.01)
*B41J 2/145* (2006.01)

(52) U.S. Cl.
CPC ........... *B41J 11/0015* (2013.01); *B41J 2/145* (2013.01)

(58) Field of Classification Search
CPC ...... B41J 11/0015; B41J 2/145; B41J 2/2114; B41J 2/2132; B41J 2/07
See application file for complete search history.

(56) References Cited

U.S. PATENT DOCUMENTS

2021/0130639 A1 5/2021 Sugihara et al.

FOREIGN PATENT DOCUMENTS

JP 2019-111763 7/2019

*Primary Examiner* — Justin Seo
*Assistant Examiner* — Tracey M McMillion
(74) *Attorney, Agent, or Firm* — GREENBLUM & BERNSTEIN, P.L.C.

(57) ABSTRACT

An inkjet printing apparatus includes: a first and a third head that ejects ink onto a print medium to form a printed image; a second head that coats the print medium with a treatment agent that contains a coagulant that coagulates ink; and a control unit that performs a two step ink ejection control process to control the first through third heads such that ink is ejected onto the print medium until a printing rate in a predetermined region of the print medium reaches a threshold value which is set in advance, coats the treatment agent thereafter, and then ejects ink according to a remaining printing rate after the treatment agent is coated.

7 Claims, 22 Drawing Sheets

METHOD AND APPARATUS FOR CONTROLLING INK EJECTION

CROSS-REFERENCE TO RELATED APPLICATIONS

The present application claims priority under 35 U.S.C. § 119 to Japanese Patent Application No. 2021-107730, filed on Jun. 29, 2021. The above application is hereby expressly incorporated by reference, in its entirety, into the present application.

BACKGROUND OF THE INVENTION

1. Field of the Invention

The present invention is related to an ink ejection control apparatus and a method for ejecting ink onto a print medium to form a printed image.

2. Description of the Related Art

Conventionally, an inkjet printing apparatus has been proposed in which ink is ejected from an inkjet head to print on print media such as paper and film.

When performing inkjet printing on a non-permeable material such as a film, unlike permeable materials such as cloth, paper, and synthetic paper coated with an absorbent layer, ink is not absorbed by the material. As a result, ink dots coalesce. The coalescence of ink dots is a phenomenon in which adjacent ink dots combine to form a single ink dot.

For the purpose of preventing such coalescence of ink dots, Japanese Unexamined Patent Publication No. 2019-111763, for example, proposes a method of forming a printed image by ejecting ink after applying a treatment agent that contains a flocculent that coagulates ink.

SUMMARY OF THE INVENTION

However, in the case of a non-permeable material having a high contact angle with water such as a vinyl chloride film, the wettability of the treatment agent to the material is poor. As illustrated in FIG. 19, the treatment agent stays on the material in the form of droplets in a shape that approximates a hemisphere in the case that the treatment agent is coated onto the material.

It has become clear that when ink lands on such droplets of the treatment agent, the following problems occur as compared with a case in which ink lands on the wet and thinly spread layer of the treatment agent.

The droplets of the treatment agent are locally present and therefore have high coagulation force. Therefore, when ink lands and comes into contact with the droplets of the treatment agent, the ink is immediately coagulated and sufficient dot size cannot be obtained, as illustrated in FIG. 20. As a result, image quality such as a solid filling property deteriorates, and the amount of ink required to obtain a desired image increases. The solid filling property is a standard of how much the material can be filled with ink dots.

Further, in the case that ink lands on the droplets of the treatment agent, the landing position of the ink deviates from the target landing position, or the dot shape of the ink becomes distorted, resulting in poor image quality, as illustrated in FIG. 21.

Note that in the case that the treatment agent does not form droplets as described above and is spread thinly as illustrated in FIG. 22, ink wets and spreads easily, sufficient dot size can be obtained, the ink can land close to target positions, and the dot shape of the ink can be made to be close to a perfect circle.

An object of the present invention is to provide an ink ejection control apparatus and a method capable of improving the image quality of a printed image such as solid filling property while suppressing coalescence of ink droplets.

The ink ejection control apparatus according to the present invention is equipped with an ink ejection unit that ejects ink to a print medium to form a printed image, a processing unit that coats the print medium with a treatment agent that contains a coagulant that coagulates ink, and a control unit that performs a two step ink ejection control process to control the ink ejecting unit and the processing unit such that ink is ejected onto the print medium until a printing rate in a predetermined region of the print medium reaches a threshold value which is set in advance, coats the treatment agent thereafter, and then ejects ink according to a remaining printing rate after the treatment agent is coated.

According to the ink ejection control apparatus of the present invention, the control unit that performs a two step ink ejection control process to control the ink ejecting unit and the processing unit such that ink is ejected onto the print medium until a printing rate in a predetermined region of the print medium reaches a threshold value which is set in advance, coats the treatment agent thereafter, and then ejects ink according to a remaining printing rate after the treatment agent is coated. Therefore, coalescence of ink can be suppressed during the first ink ejecting operation, sufficient dot size can be secured during the second ink ejecting operation following the coating of the treatment agent, and the shapes of the dots can be caused to approximate perfect circles. Thereby, the image quality, such as the solid filling property, of a printed image can be improved.

DETAILED DESCRIPTION OF THE INVENTION

Figure 1:
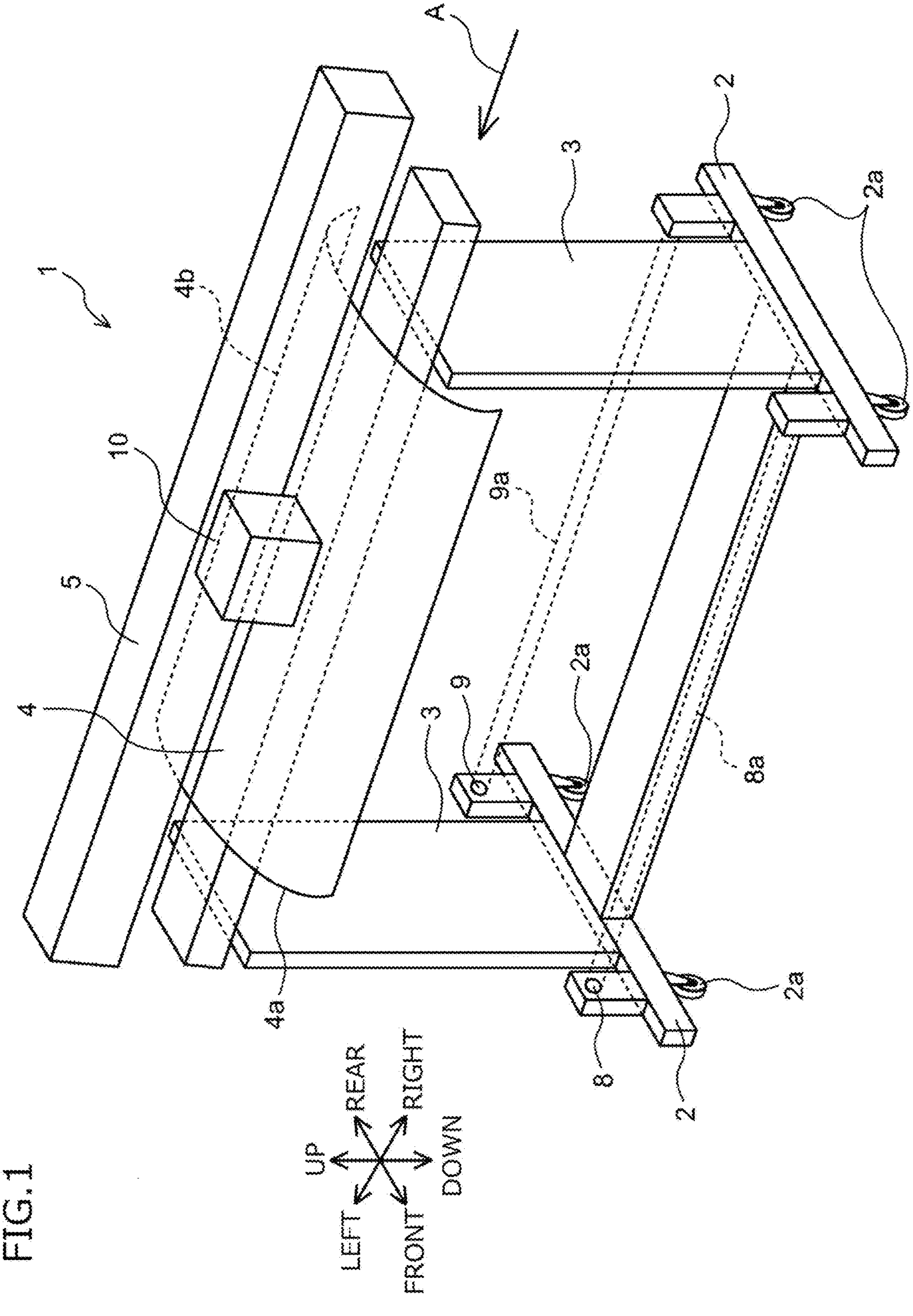
FIG. 1 is a diagram that illustrates the schematic configuration of an inkjet printing apparatus that employs an ink ejection control apparatus according to a first embodiment of the present invention.
Figure 2:
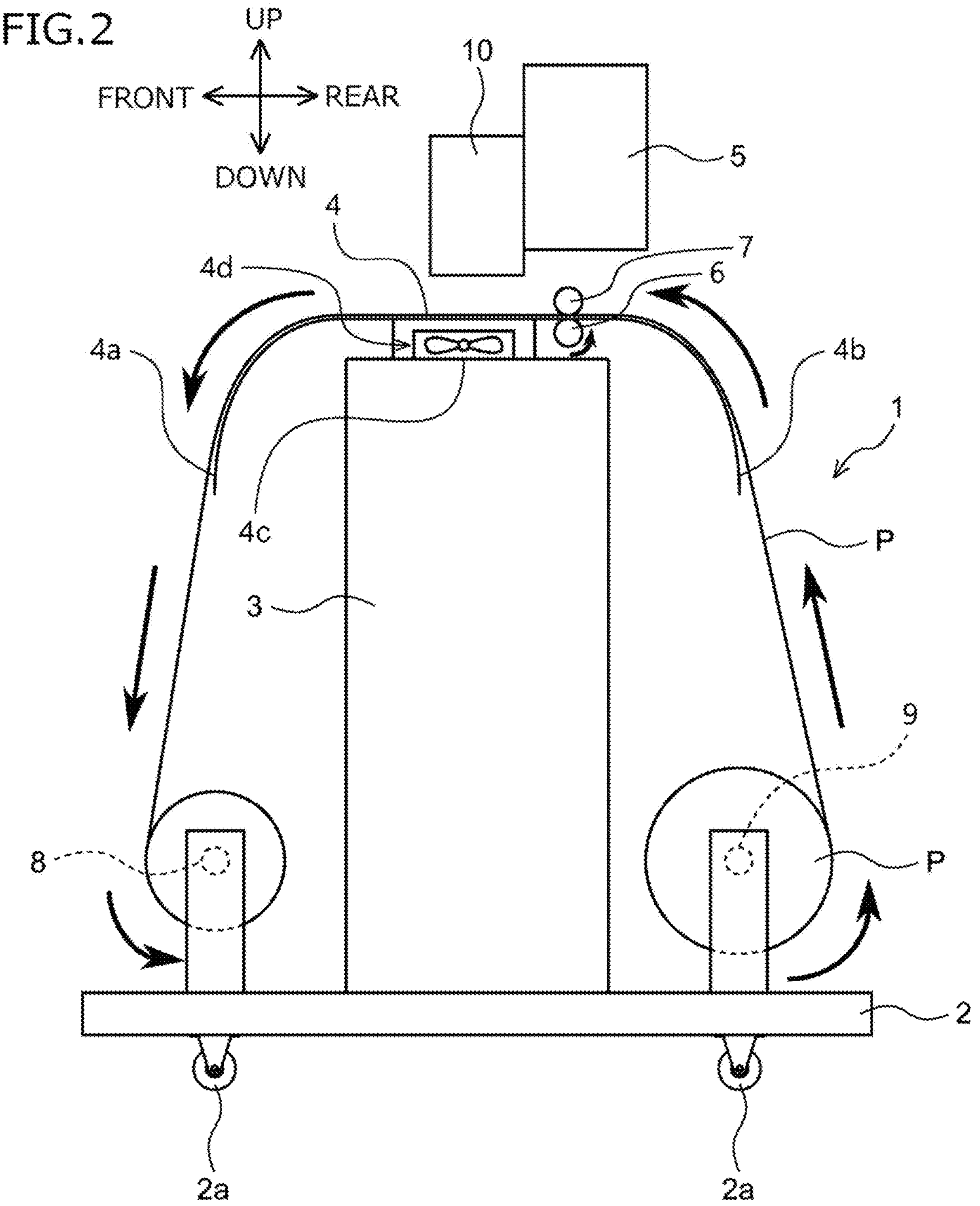
FIG. 2 is a view of the inkjet printing apparatus illustrated in FIG. 1 as viewed from the direction of arrow A.

Hereinafter, an inkjet printing apparatus that employs an ink ejection control apparatus according to a first embodiment of the present invention will be described in detail with reference to the drawings. The inkjet printing apparatus of the present embodiment is characterized by the configuration of ink ejection control, but first, the configuration of the entire inkjet printing apparatus will be described. FIG. 1 is a schematic configuration diagram of the inkjet printing apparatus 1 of the present embodiment. Further, FIG. 2 is a view of the inkjet printing apparatus 1 illustrated in FIG. 1 as viewed from the direction of arrow A. In the following description of the embodiment the up, down, left to right, front, and rear directions indicated by the arrows in FIG. 1 are the up, down, left to right, front, and rear directions in the inkjet printing apparatus 1.

As illustrated in FIG. 1, the inkjet printing apparatus 1 of the present embodiment is equipped with bases 2, leg stands 3, a platen 4, a rail portion 5, and a head unit 10. In the present embodiment, the head unit 10 corresponds to the ink ejection unit of the present invention.

The bases 2 are columnar members that extend in the front to rear direction, and are arranged parallel to each other with a space therebetween in the left to right direction. Two wheels **2*a* are provided on the bottom surfaces each of the two bases 2**, respectively.

One leg stand 3 is erected on each base 2. The platen 4 is supported on the upper surfaces of the two leg stands 3 that face each other.

An arcuate shaped front guide **4*a* and a rear guide 4*b* extend in front of and behind the platen 4. Further, a vacuum chamber 4*c* in which a fan 4*d* is installed is provided at the lower part of the platen 4, as illustrated in FIG. 2. The vacuum chamber 4*c* is omitted from FIG. 1**.

When the fan **4*d* of the vacuum chamber 4*c* rotates, the interior of the vacuum chamber 4*c* becomes in a negatively pressured state, and a suction force is generated in suction apertures (not shown) which are formed in the platen 4. A print medium P is held on the platen 4 by the suction force generated through the suction apertures of the platen 4**.

Further, a drive roller 6 and a pressure roller 7 are provided facing each other, behind the platen 4, as illustrated in FIG. 2. The drive roller 6 and the pressure roller 7 are omitted from FIG. 1.

The drive roller 6 is an elongate roller that extends in the direction that the platen 4 extends in, and is rotated by a conveyance drive motor 61 (refer to FIG. 4) to be described later.

Similar to the drive roller 6, the pressure roller 7 is an elongate roller that extends in the direction that the platen 4 extends in, and is supported by an elevating mechanism (not shown) so as to be able to move in the vertical direction.

The print medium P on the rear guide **4*b* is sandwiched between the drive roller 6 and the pressure roller 7, and the drive roller 6 rotates while the print medium P is pressed by the pressure roller 7**, whereby the print medium P is conveyed forward.

A take up side core holding portion 8 for detachably holding a core **8*a* for winding the print medium P is provided at the front side of the base 2 of the inkjet printing apparatus 1. The take up side core holding portion 8 is coupled to a take up drive motor 81 (refer to FIG. 4) via a torque limiter (not shown), and the take up side core holding portion 8 is configured to rotate by the take up drive motor 81** being driven.

In addition, a supply side core holding portion 9 for detachably holding a core **9*a* of a roll in which the print medium P is wound in a roll shape is provided on the rear side of the base 2 of the inkjet printing apparatus 1. The supply side core holding portion 9 is coupled to a supply drive motor 91 (refer to FIG. 4) via a torque limiter (not shown), and the supply side core holding portion 9 is configured to be rotated by the supply drive motor 91** being driven.

As illustrated in FIG. 2, the inkjet printing apparatus 1 is of a configuration in which the roll (print medium P) held by the supply side core holding portion 9 is pulled out, and is wound up by the core **8*a* which is held by the take up side core holding portion 8 after passing the rear guide 4*b*, passing between the drive roller 6 and the pressure roller 7, passing above the platen 4, and passing the front guide 4*a***.

The rail portion 5 is erected on the upper portion of the two leg stands 3 via a support member (not shown). The rail portion 5 includes a rail (not shown) that extends in the left to right direction and a main scanning drive motor 51 (refer to FIG. 4) that moves the head unit 10 reciprocally along the rail in the left to right direction.

A smoothed film formed of materials such as polyvinyl chloride, nylon, and PET (polyethylene terephthalate) may be employed as the print medium P. The contact angle with water with respect to a polyvinyl chloride film is about 87°, the contact angle with water with respect to a nylon film is about 70°, and the contact angle with water with respect to a PET film is about 90°. The present invention is particularly effective when printing is performed on a print medium P having a contact angle with water which is 60° or greater.

Figure 3:
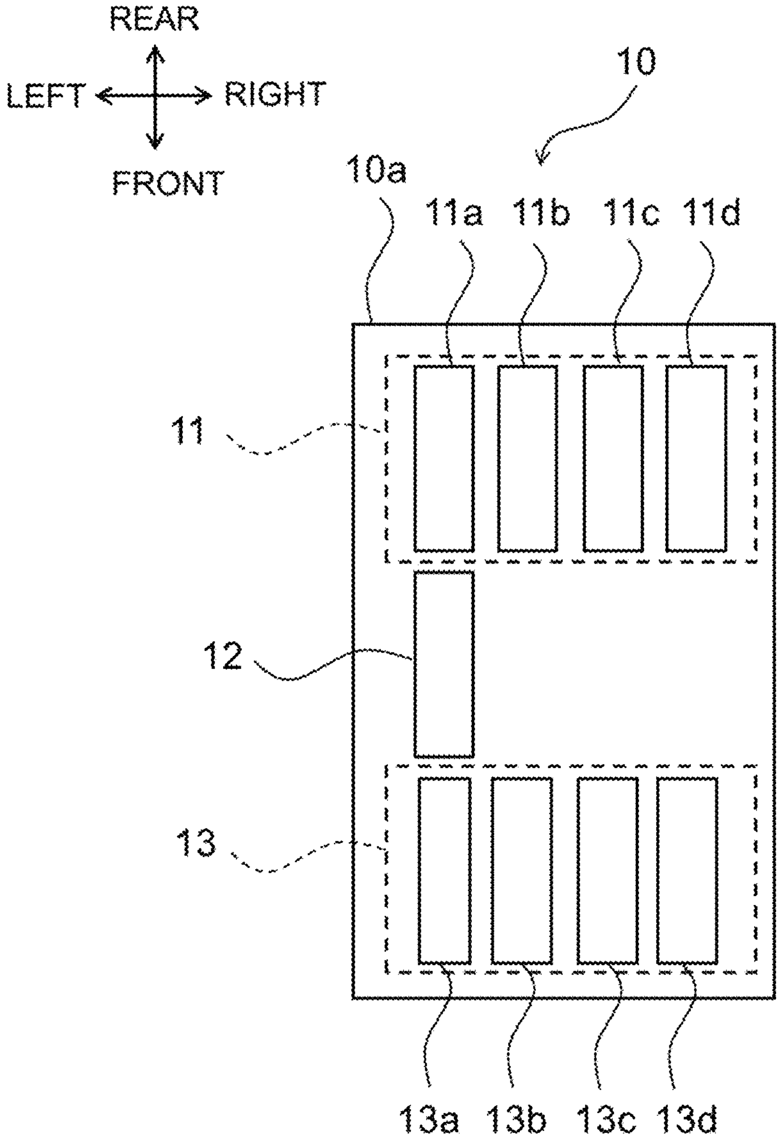
FIG. 3 is a plan view that illustrates the schematic configuration of a head unit of the inkjet printing apparatus according to the first embodiment.

Next, the head unit 10 of the present embodiment will be described. FIG. 3 is a plan view that illustrates the schematic configuration of the head unit 10.

The head unit 10 of the present embodiment is equipped with a first head 11, a second head 12, and a third head 13 as illustrated in FIG. 3. In the present embodiment, the first head 11 corresponds to a first ink ejection head of the present invention, and the second head 12 corresponds to a treatment agent ejection head (treatment agent coating unit) of the present invention. The third head 13 corresponds to a second ink ejection head, and the first and third heads 11 and 13 constitute an ink ejection unit. In the present embodiment, since the head unit 10 is configured as described above, the two step ink ejection control to be described later can be performed by a simpler manner of ejection control.

The first head 11 is provided with four inkjet heads, a first inkjet head 11*a*, a second inkjet head 11*b*, a third inkjet head 11*c*, and a fourth inkjet head 11*d*.

The first through fourth inkjet heads 11*a* through 11*d* have a large number of nozzles for ejecting ink arranged in the front to rear direction (the conveyance direction of the print medium P). The first through fourth inkjet heads 11*a* through 11*d* are inkjet heads that eject inks of different colors, for example, C (cyan), M (magenta), Y (yellow), and K (black) inks. As the ink, it is preferable for a water based pigment ink to be employed.

The second head 12 has a large number of nozzles for discharging a treatment agent arranged in the front to rear direction (the conveyance direction of the print medium P). The configuration of the second head 12 is the same as that of the first through fourth inkjet heads 11*a* through 11*d*. The treatment agent is a liquid for suppressing coalescence and bleeding of ink droplets and improving color development. A known solution (preliminary processing agent B disclosed in Japanese Unexamined Patent Publication No. 2020-138456, for example) may be employed.

Specifically, it is preferable for the treatment agent to contain at least water, a coagulant and a surfactant. Further, the coagulant is preferably a water soluble cationic polymer. The coagulant is not limited to the water soluble cationic polymer, and may be a polyvalent metal salt, an organic acid, or an inorganic acid.

The third head 13 has the same configuration as the first head 11, and is provided with four inkjet heads: a fifth inkjet head 13*a*, a sixth inkjet head 13*b*, a seventh inkjet head 13*c*, and an eighth inkjet head 13*d*.

The fifth to eighth inkjet heads 13*a* to 13*d* are also inkjet heads that eject inks of different colors, for example, C (cyan), M (magenta), Y (yellow), and K (black) inks.

As illustrated in FIG. 3, the first head 11, the second head 12, and the third head 13 are arranged side by side in the conveyance direction (front to rear direction) of the print medium P.

The first through third heads 11 through 13 are held by a carriage 10*a*, and the ejection surfaces thereof are installed so as to be exposed from the carriage 10*a*.

Figure 4:
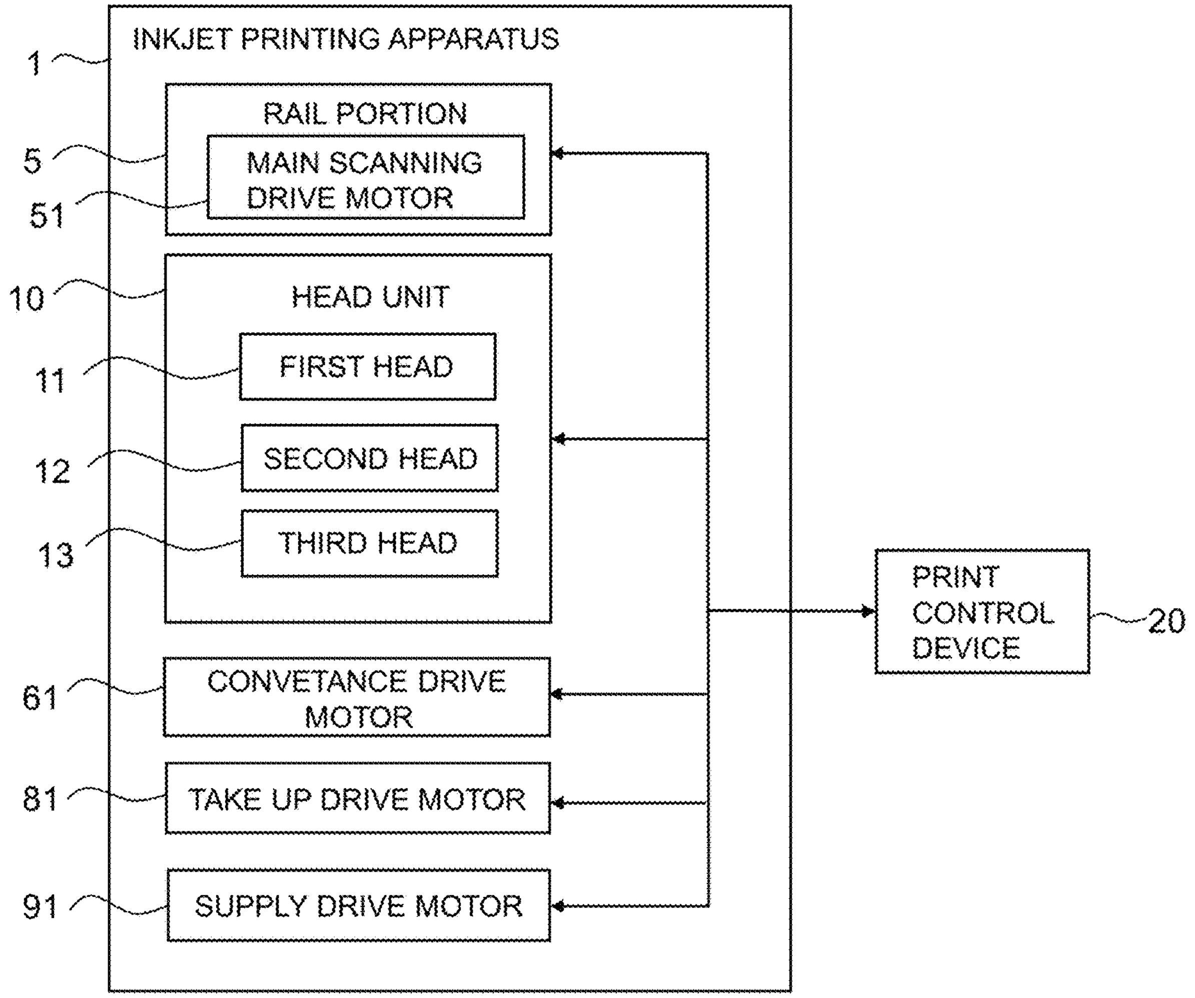
FIG. 4 is a block diagram that illustrates the configuration of a control system of an inkjet printing apparatus.

FIG. 4 is a block diagram that illustrates the configuration of a control system of the inkjet printing apparatus 1 of the present embodiment. The inkjet printing apparatus 1 operates each component of targets of control illustrated in FIG. 4 in response to control signals from a print control device 20. In the present embodiment, the print control device 20 corresponds to a control unit of the present invention.

The print control device 20 and the inkjet printing apparatus 1 are connected by a communication circuit such as a LAN (Local Area Network) or the Internet, and are configured to be able to communicate with each other. The communication may be conducted either in a wired or wireless manner.

The print control device 20 is constituted by a computer equipped with a CPU (Central Processing Unit), a semiconductor memory, a hard disk, etc. The print control device 20 executes a print control program which is stored in advance in a storage medium such as the semiconductor memory or the hard disk based on an input print job or the like, and operates electric circuits to control each of the components illustrated in FIG. 4.

The print control device 20 performs a RIP (Raster Image Processor) process on an original image to be printed, and generates a print image composed of raster data in a bitmap format. Then, the print control device 20 controls the first head 11 and the third head 13 based on the generated print image to eject ink.

Further, the print control device 20 is equipped with a high printing rate region specifying unit 20*a*. The high printing rate region specifying unit 20*a* specifies a high printing rate region in the image to be printed. The high printing rate region is an area in which the printing rate of the printed image is equal to or higher than a preset threshold value.

Note that the printing rate in the present specification is 100% in the case that a predetermined area of the print medium P is printed with a predetermined dot density and the predetermined area is completely filled with dots. For example, in the case of printing with a single color ink, the printing rate is 100% when the predetermined area in the print medium P is completely filled with ink dots of the single color, that is, when a solid image of the single color ink is obtained. When printing with inks of a plurality of colors, the printing rate is 100% when the predetermined area in the print medium P is filled with the ink dots of each color.

Figure 5:
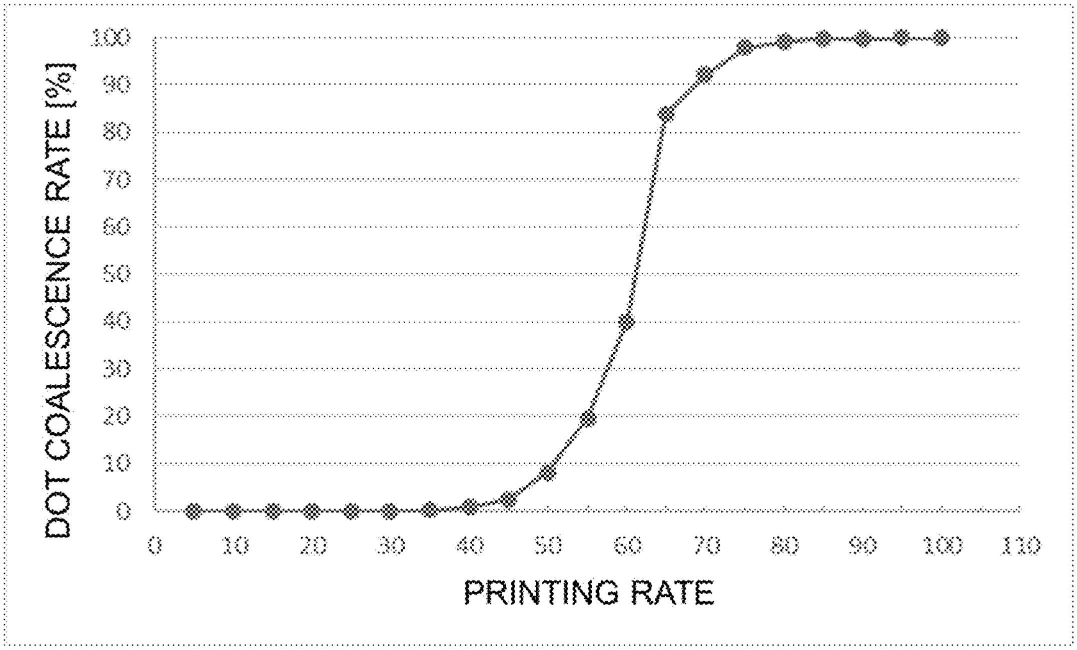
FIG. 5 is a diagram that illustrates an example of the relationship between printing rates and the coalescence rates of ink dots.

FIG. 5 is a diagram that illustrates an example of the relationship between printing rates and coalescence rates of ink dots when ink is ejected onto a region of 2000 μm×3000 μm without a treatment agent. The coalescence rate is defined as (Number of Coalesced Landed Dots)/(Total Number of Landed Dots). In the example illustrated in FIG. 5, if the printing rate is about 45%, the coalescence rate of ink dots is low. Therefore, it can be said that the printing rate has little adverse effect on the printed image even if the treatment agent is not used. For this reason, in the present embodiment, the threshold value for the high printing rate region is set to 40%, for example. The method of setting the threshold value in the high printing rate region is not limited to this, and a printing rate in a case that printing is performed by actually changing the printing rate and the printed image is visually confirmed and prior to ink dot coalescence increasing may be set as the threshold value.

Then, the print control device 20 confirms whether a high printing rate region is present in the printed image by the aforementioned high printing rate region specifying unit 20*a* specifying the high printing rate region, and in the case that a high printing rate region is present in the printed image two step ink ejection control is performed only for the high printing rate region to form a printed image. Note that the amount of ink and ink dot density may be employed instead of the printing rate as parameters for specifying the high printing rate region, and parameters are not limited to the printing rate, as long as the parameters are related to the amount of ink and the ink dot density ejected onto the print medium P. The two step ink ejection control of the present embodiment will be described below.

When the print control device 20 performs the two step ink ejection control for a high printing rate region, it first controls the first head 11 to eject ink onto the print medium P and to form a printed image. At this time, the ink is ejected until the printing rate with respect to the print medium P reaches a preset threshold value. The preset threshold value is a printing rate lower than the printing rate of the printed image to be ultimately obtained, and is set to be within a range from 20% to 40%, for example.

The print control device 20 controls the second head 12 to eject the treatment agent onto the high printing rate region after the ink is ejected by the first head 11.

Next, the print control device 20 controls the third head 13 after the treatment agent is ejected by the second head 12 to eject ink according to the remaining printing rate onto the region where the treatment agent is ejected. The remaining printing rate is the remaining printing rate until the printing rate of the printed image to be ultimately obtained is reached. For example, in the case that the printing rate of ink ejection by the first head 11 is 40%, the printing rate of ink ejection by the third head 13 is the remaining 60%.

As described above, the print control device 20 of the present embodiment ejects ink until the printing rate of the print medium P reaches a predetermined threshold, then ejects the treatment agent, and ejects ink according to the remaining printing rate after the treatment agent is ejected.

Thereby, it is possible to secure a sufficient dot size at the time of the first ink ejection, to land the ink close to target positions, and to cause dot shapes to approximate perfect circles. Next, by applying the treatment agent and ejecting the ink for the second time, adverse effects such as a decrease in the dot size of the ink, the deviation of landing positions, and the deterioration of dot shapes due to the ejection of the treatment agent first are minimized, while forming an image in which coalescence of ink dots and bleeding are suppressed. Therefore, it is possible to improve the image quality, such as the solid filling property, of the printed image.

The print control device 20 controls the first head 11 or the third head 13 to form a printed image in print image areas other than the high printing rate region. Alternatively, the print control device 20 controls both of the first head 11 and the third head 13 to form a printed image, and controls the second head 12 so as not to eject the treatment agent. In the present embodiment, the two step ink ejection control is performed only in the high printing rate region, and the treatment agent is not ejected in the other regions, so that the amount of the treatment agent can be reduced.

Figure 6:
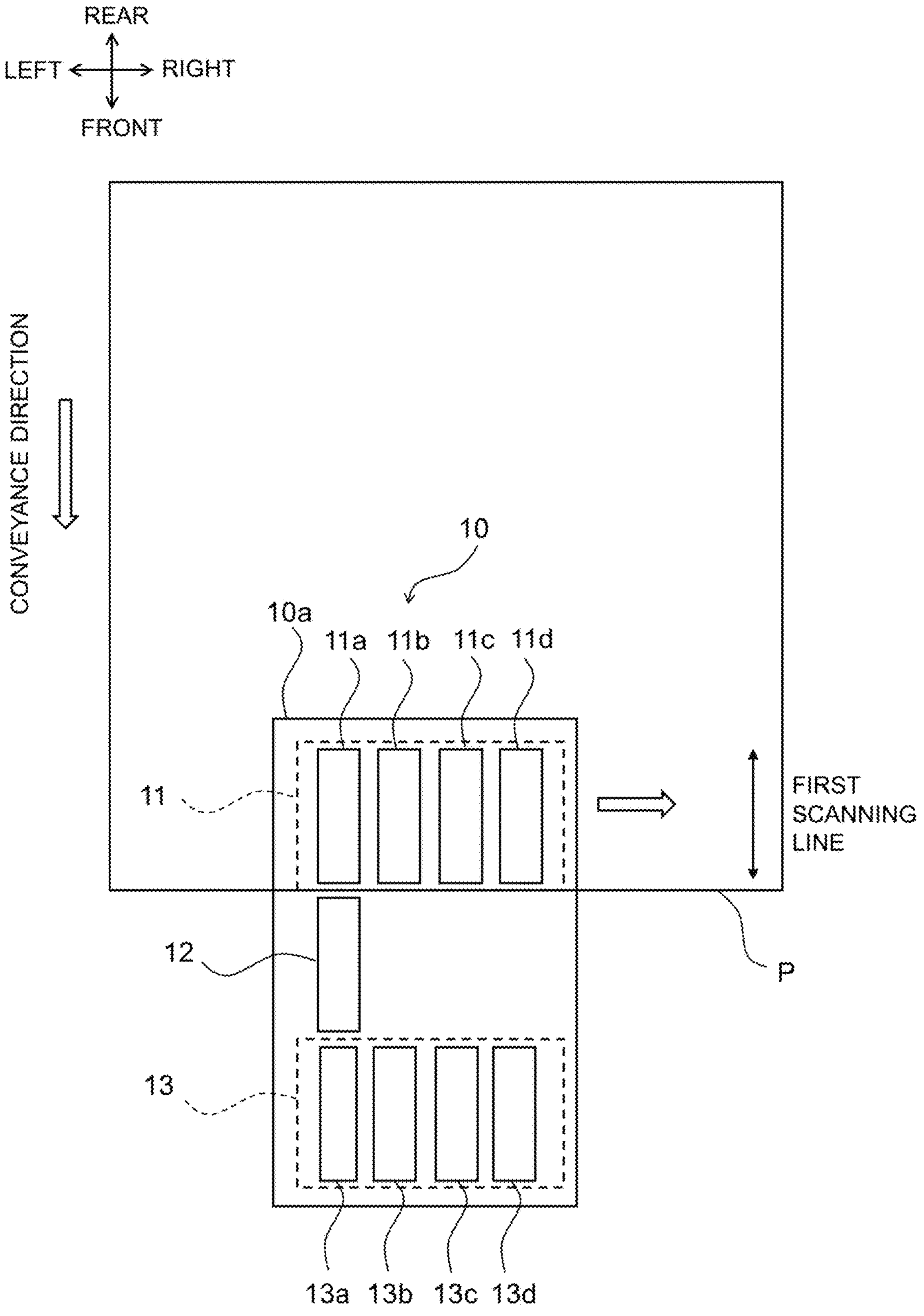
FIG. 6 is a diagram for explaining a printing operation of the inkjet printing apparatus according to the first embodiment.

Next, the overall flow of the printing operation of the inkjet printing apparatus 1 of the present embodiment will be described with reference to FIGS. 6 through 8.

First, a roll is installed in the supply side core holding portion 9, and the roll (print medium P) is pulled out and is wound up by the core 8*a* which is held by the take up side core holding portion 8 after passing the rear guide 4*b*, passing between the drive roller 6 and the pressure roller 7, passing above the platen 4, and passing the front guide 4*a*, as illustrated in FIG. 2.

Then, the print control device 20 feeds out the print medium P by rotating the supply side core holding portion 9, the take up side core holding portion 8, and the drive roller 6, and when the print medium P reaches an initial printing position, feed out of the print medium P is ceased temporarily.

Next, the print control device 20 operates the main scanning drive motor 51 to move the head unit 10 in a first direction (for example, to the right) along the rail portion 5. Then, as illustrated in FIG. 6, the print control device 20 operates the first head 11 of the head unit 10 as the head unit 10 moves, and ejects ink onto a first scanning line. At this time, in the case that a high printing rate region exists in the first scanning line, ink is ejected onto the high printing rate region until the printing rate reaches a predetermined threshold value. The second head 12 and the third head 13 are not operated during the scanning of the first scanning line.

Figure 7:
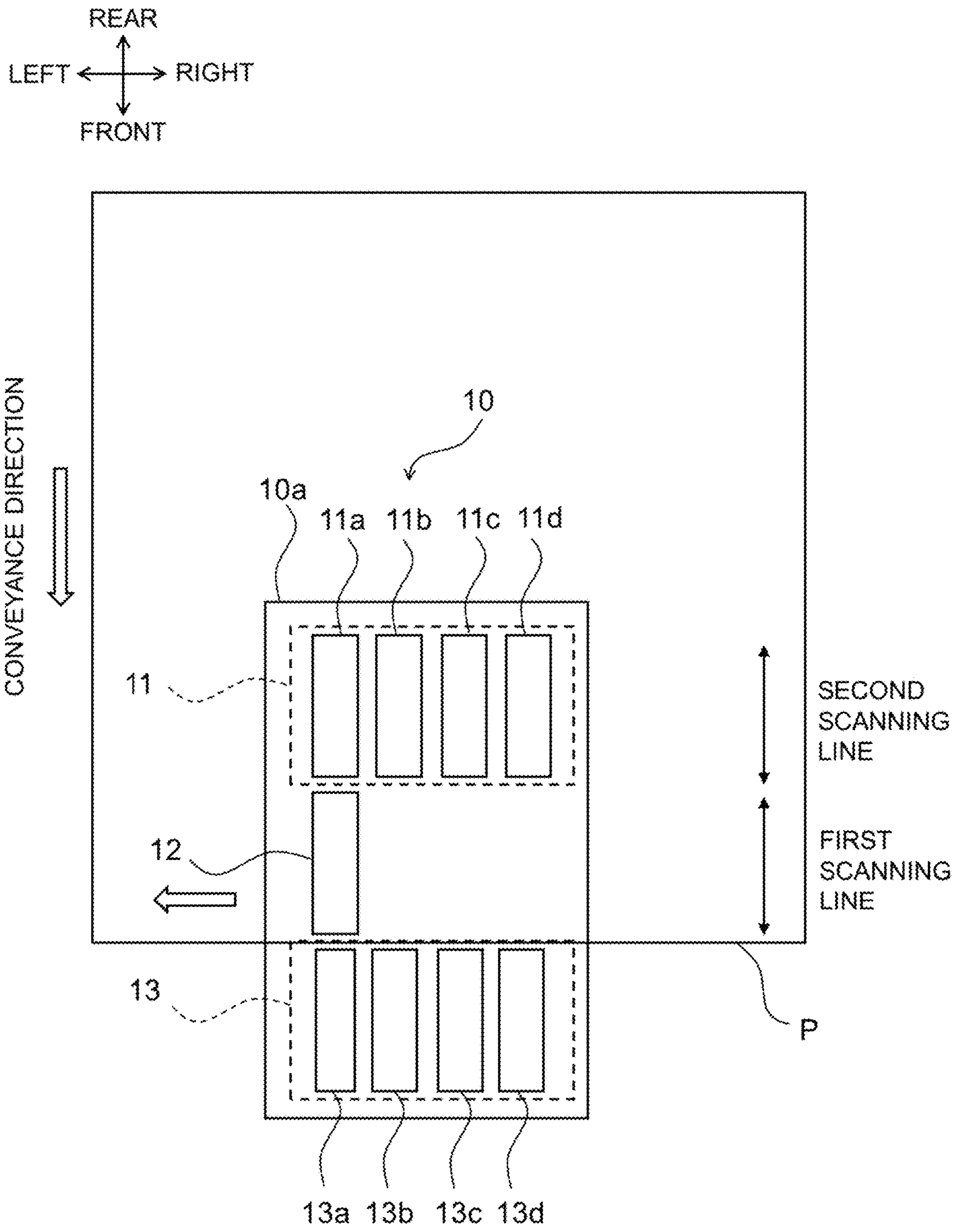
FIG. 7 is a diagram for explaining a printing operation of the inkjet printing apparatus according to the first embodiment.

Thereafter, the print control device 20 feeds out the print medium P by one scanning line so that the first scanning line is positioned directly under the second head 12, as illustrated in FIG. 7.

Then, the print control device 20 moves the head unit 10 along the rail portion 5 in a second direction (for example, to the left) opposite the first direction. At this time, in the case that a high printing rate region exists in the first scanning line, the print control device 20 controls the second head 12 to eject the treatment agent only onto the high printing rate region and not to eject the treatment agent onto regions other than the high printing rate region. Further, the print control device 20 does not control the second head 12 to eject the treatment agent in the case that a high printing rate region is not present in the first scanning line.

In addition, the print control device 20 controls the second head 12 to eject the treatment agent onto the first scanning line as described above, and operates the first head 11 to eject ink onto a second scanning line that follows the first scanning line. The control of ink ejection (printing rate) at this time is the same as in the case of the first scanning line.

Figure 8:
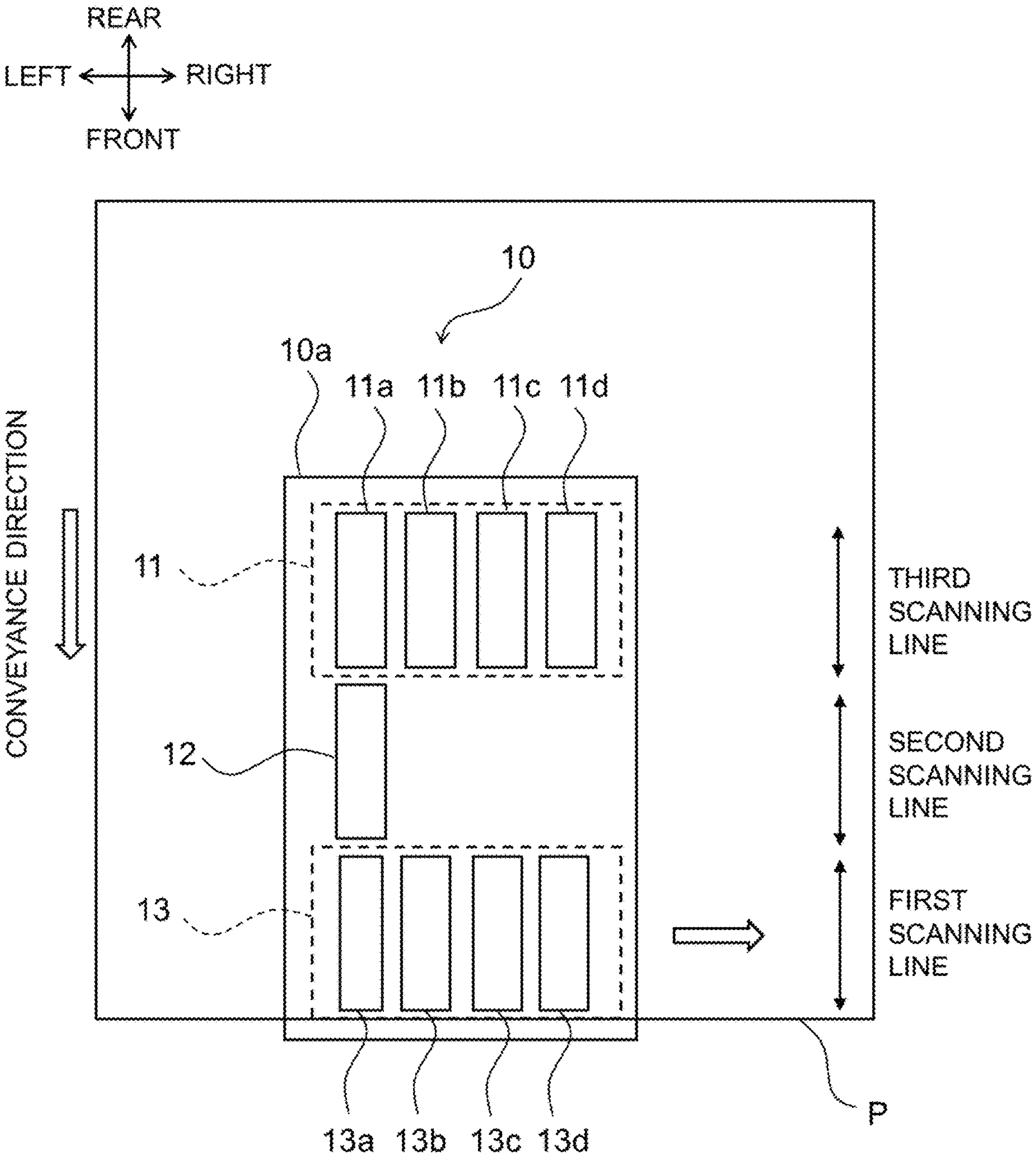
FIG. 8 is a diagram for explaining a printing operation of the inkjet printing apparatus according to the first embodiment.

Subsequently, the print control device 20 feeds out the print medium P for a distance that corresponds to one scanning line, to position the first scanning line directly beneath the third head 13, position the second scanning line directly beneath the second head 12, and position a third scanning line that follows the second scanning line directly beneath the first head 11, as illustrated in FIG. 8.

Then, the print control device 20 moves the head unit 10 in the first direction along the rail portion 5, and operates the first through third heads 11 through 13 together with the movement to perform a second ink ejecting operation onto the first scanning line, eject the treatment agent onto the second scanning line, and to perform a first ink ejecting operation onto the third scanning line.

In the case that a high printing rate region exists in the first scanning line, the print control device 20 forms a printed image by ejecting ink corresponding to the remaining printing rate onto the high printing rate region. The ejection control of the treatment agent onto the second scanning line is the same as that for the first scanning line described above. In addition, the control of ink ejection (printing rate) onto the third scanning line is the same as that for the first scanning line.

Next, the print control device 20 feeds out the print medium P for a distance that corresponds to one scanning line, to position the second scanning line directly beneath the third head 13, position the third scanning line directly beneath the second head 12, and to position a fourth scanning line that follows the third scanning line directly beneath the first head 11.

Then, the print control device 20 moves the head unit 10 in the second direction along the rail portion 5, and operates the first through third heads 11 through 13 together with the movement to perform the second ink ejecting operation onto the second scanning line, to eject the treatment agent onto the third scanning line, and to perform the first ink ejection onto the fourth scanning line.

In the case that a high printing rate region is present in the second scanning line, the print control device 20 ejects ink corresponding to the remaining printing rate onto the high printing rate region to form a printed image. The ejection control of the treatment agent onto the third scanning line is the same as that for the first scanning line described above.

Further, the control of ink ejection (printing rate) onto the fourth scanning line is the same as that for the first scanning line.

Thereafter, the print control device 20 alternately repeats feed out of the print medium P for a distance that corresponds to one scanning line and moving the head unit 10 in the first direction or the second direction along the rail portion 5 in the same manner as described above. These operations sequentially and repeatedly perform a second ink ejecting operation onto an nth scanning line, the ejection of the treatment agent onto an n−1th scanning line, and a first ink ejecting operation onto an n−1th scanning line.

Next, an inkjet printing apparatus that employs an ink ejection control apparatus according to a second embodiment of the present invention will be described. The inkjet printing apparatus of the second embodiment has a different configuration for the head unit 10 from the inkjet printing apparatus 1 of the first embodiment, and the method of two step ink ejection control is also different. The other configurations are the same as those of the inkjet printing apparatus 1 of the first embodiment. Hereinafter, a description will be given mainly of the differences from the inkjet printing apparatus 1 of the first embodiment.

Figure 9:
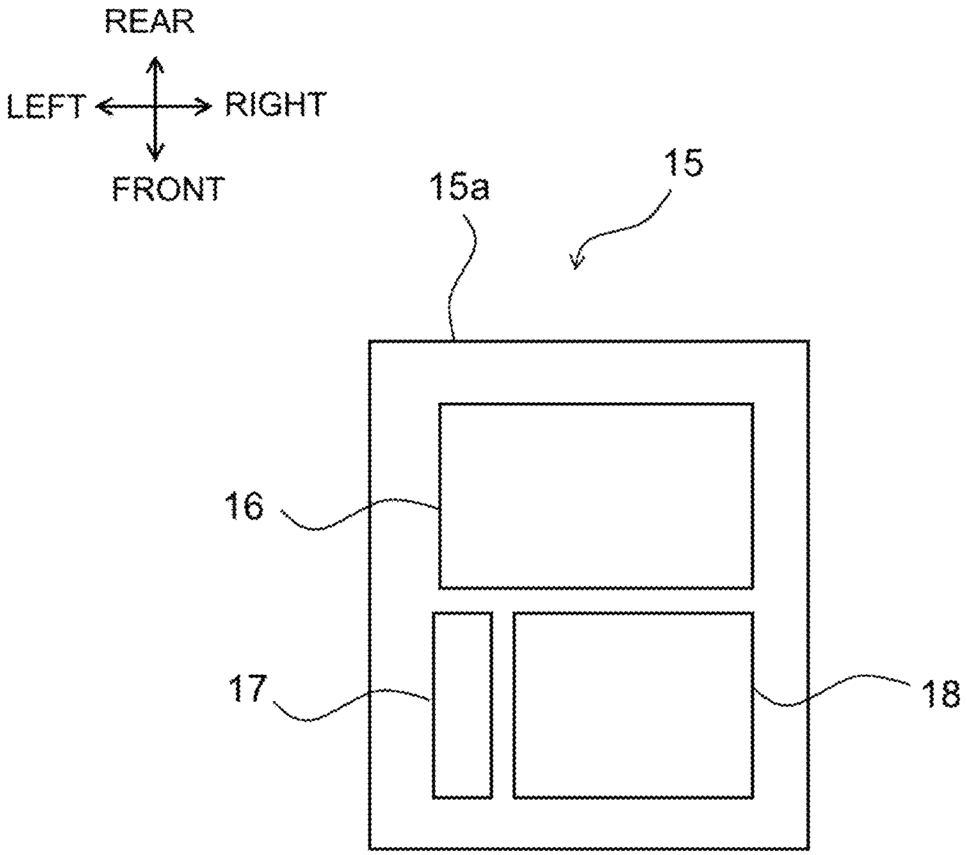
FIG. 9 is a plan view that illustrates the schematic configuration of a head unit of an inkjet printing apparatus according to a second embodiment.

FIG. 9 is a plan view of the head unit 15 in the inkjet printing apparatus according to the second embodiment. As illustrated in FIG. 9, the head unit 15 is equipped with a first head 16, a second head 17, and a third head 18.

The first head 16 of the head unit 15 is the same as the first head 11 of the head unit 10 of the first embodiment. In the head unit 10 of the first embodiment, the second head 12 and the third head 13 are arranged in the front to rear direction (the conveyance direction of the print medium P), but the head unit 15 of the second embodiment, the second head 17 and the third head 18 are arranged in the left to right direction (the moving direction of the head unit 10).

The configuration and function of the second head 17 are the same as those of the second head 12 of the first embodiment, and the second head ejects the treatment agent onto the print medium P. In addition, the configuration and function of the third head 18 are the same as those of the third head 13 of the first embodiment, and the third head 18 performs second ink ejecting operations.

The first through third heads 16 through 18 are held by the carriage 15*a*, and the ejection surface thereof is installed so as to be exposed from the carriage 15*a*.

In the first embodiment, after the treatment agent is ejected onto the print medium P by the second head 12, the third head 13 ejects ink onto the print medium P in a second ink ejecting operation at intervals of a scanning time for one scanning line. However, in the second embodiment, the ejection of the treatment agent from the second head 17 and the ejection of ink from the third head 18 are performed during the same period of time. Specifically, while the second head 17 and the third head 18 are scanning the same scanning line, the treatment agent is ejected from the second head 17 and ink is ejected from the third head 18.

Therefore, the same period of time described above for the case to be described below is 0.5 seconds or less, and preferably 0.3 seconds or less, for example. This is because in the case that the width of the carriage 15*a* in the left to right direction is 30 cm and the moving speed of the head unit 15 in the left to right direction (the direction perpendicular to the conveyance direction of the print medium P) is 1 m/s, the amount of time required to move from one end to the other end of the carriage 15*a* in the left to right direction is 0.3 s.

A temporal interval between a preferred timing of the treatment agent ejecting operation and the timing of the second ink ejecting operation will be described. Particularly in a print medium having a contact angle with water of 60° or more, depending on the amount of the treatment agent ejected, the droplets that land may coalesce with each other with the passage of time immediately after the treatment agent has landed, and the treatment agent may be coated unevenly. For this reason, it is preferable for the temporal interval between the timing of the treatment agent ejecting operation and the timing of the second ink ejecting operation to be short. It is preferable for this temporal interval to be 1 second or less.

Therefore, the aforementioned same period of time is preferably 1 second or less, more preferably 0.5 seconds or less, and still more preferably 0.3 seconds or less. Either of the timing of the treatment agent ejecting operation and the timing of the second ink ejecting operation may be first, as long as they are within the aforementioned temporal interval.

Figure 10:
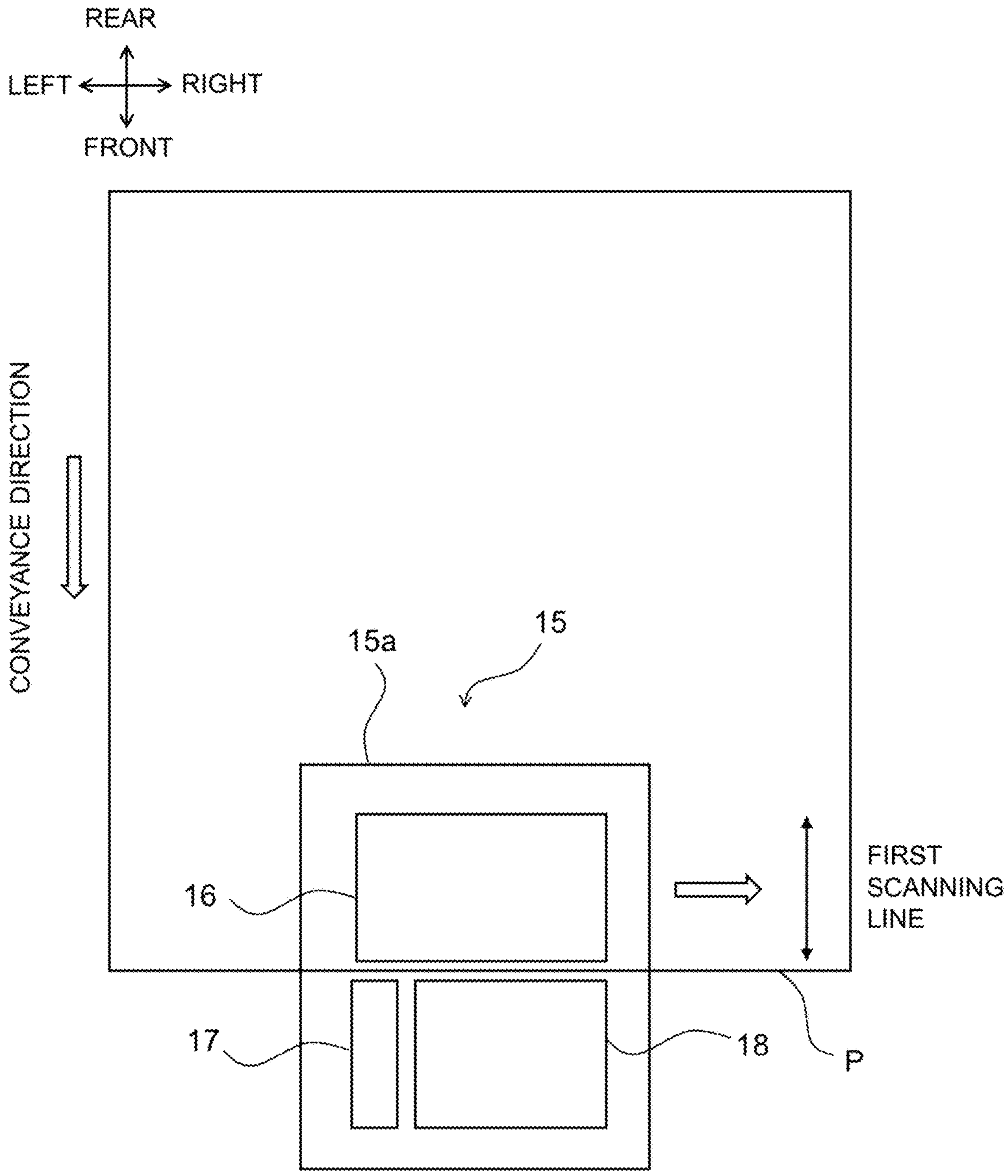
FIG. 10 is a diagram for explaining a printing operation of the inkjet printing apparatus according to the second embodiment.

Next, the overall flow of the printing operation of the inkjet printing apparatus according to the second embodiment will be described with reference to FIGS. 10 and 11.

First, a roll is installed in the supply side core holding portion 9, and the roll (print medium P) is pulled out and is wound up by the core 8*a* which is held by the take up side core holding portion 8 after passing the rear guide 4*b*, passing between the drive roller 6 and the pressure roller 7, passing above the platen 4, and passing the front guide 4*a*, as illustrated in FIG. 2.

Then, the print control device 20 feeds out the print medium P by rotating the supply side core holding portion 9, the take up side core holding portion 8, and the drive roller 6 as illustrated in FIG. 2, and when the print medium P reaches an initial printing position, feed out of the print medium P is ceased temporarily.

Next, the print control device 20 operates the main scanning drive motor 51 to move the head unit 15 in a first direction (for example, to the right) along the rail portion 5. Then, as illustrated in FIG. 10, the print control device 20 operates the first head 16 of the head unit 15 as the head unit 15 moves, and ejects ink onto a first scanning line to form a printed image. At this time, in the case that a high printing rate region exists in the first scanning line, ink is ejected onto the high printing rate region until the printing rate reaches a predetermined threshold value. Note that the second head 17 and the third head 18 are not operated during the scanning of the first scanning line.

Figure 11:
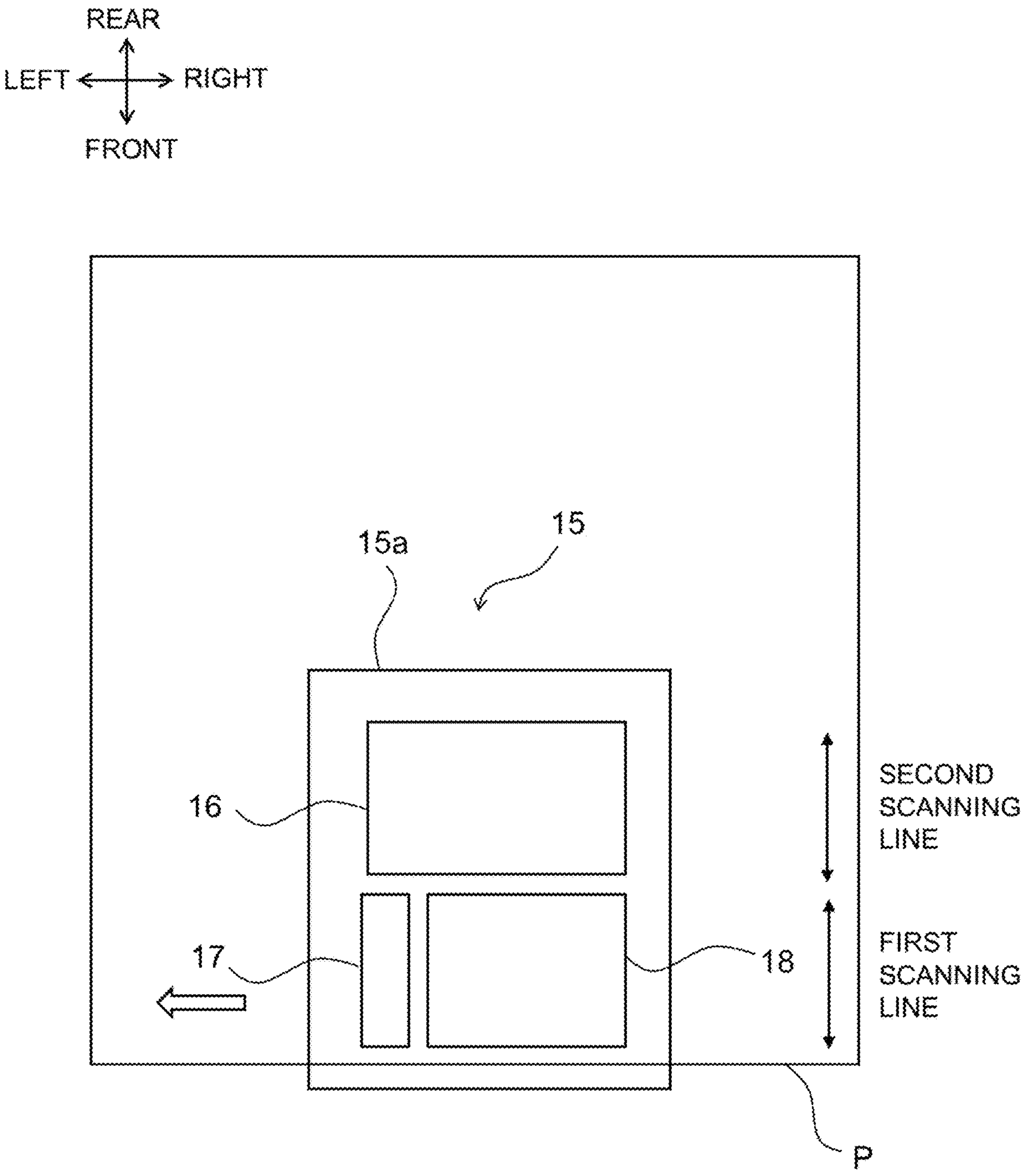
FIG. 11 is a diagram for explaining a printing operation of the inkjet printing apparatus according to the second embodiment.

Thereafter, the print control device 20 feeds out the print medium P by one scanning line such that the first scanning line is positioned directly under the second head 17 and the third head 18, as illustrated in FIG. 11.

Then, the print control device 20 moves the head unit 15 along the rail portion 5 in a second direction (for example, to the left) opposite the first direction. At this time, in the case that a high printing rate region exists in the first scanning line, the print control device 20 controls the second head 17 to eject the treatment agent only onto the high printing rate region and not to eject the treatment agent onto regions other than the high printing rate region. In addition, the print control device 20 does not control the second head 17 to eject the treatment agent in the case that a high printing rate region is not present in the first scanning line. Further, the print control device controls the third head 18 to perform a second ink ejecting operation during the same period of time as the treatment agent ejecting operation by the second head 17 described above.

In addition, the print control device 20 controls the second head 17 to eject the treatment agent onto the first scanning line as described above, and operates the first head 16 to eject ink onto a second scanning line that follows the first scanning line. The control of ink ejection (printing rate) at this time is the same as in the case of the first scanning line.

Subsequently, the print control device 20 feeds out the print medium P for a distance that corresponds to one scanning line, to position the second scanning line directly beneath the second head 17 and the third head 18, and position a third scanning line that follows the second scanning line directly beneath the first head 16.

Then, the print control device 20 moves the head unit 15 in the first direction along the rail portion 5, and operates the first through third heads 16 through 18 together with the movement to perform a second ink ejecting operation onto the second scanning line from the third head 18 and to perform a treatment agent ejecting operation from the second head 17 onto the second scanning line during the same period of time. In addition, the print control device 20 controls the first head 16 to perform a first ink ejecting operation onto the third scanning line. The control of ink ejection (printing rate) onto the third scanning line is the same as in the case of the first scanning line.

Thereafter, the print control device 20 alternately repeats feed out of the print medium P for a distance that corresponds to one scanning line and moving the head unit 10 in the first direction or the second direction along the rail portion 5 in the same manner as described above. These operations sequentially and repeatedly perform a second ink ejecting operation and the ejection of the treatment agent onto an nth scanning line, and a first ink ejecting operation onto an n−1th scanning line.

According to the inkjet printing apparatus of the second embodiment, as in the inkjet printing apparatus 1 of the first embodiment, it is possible to suppress the coalescence of ink and improve the image quality, such as the solid filling property, of the printed image. Further, because the ejection of the treatment agent and the second ink ejecting operation are performed during the same amount of time, it is possible to prevent the droplets of the landed treatment agent from coalescing and also to shorten the total printing time.

Figure 12:
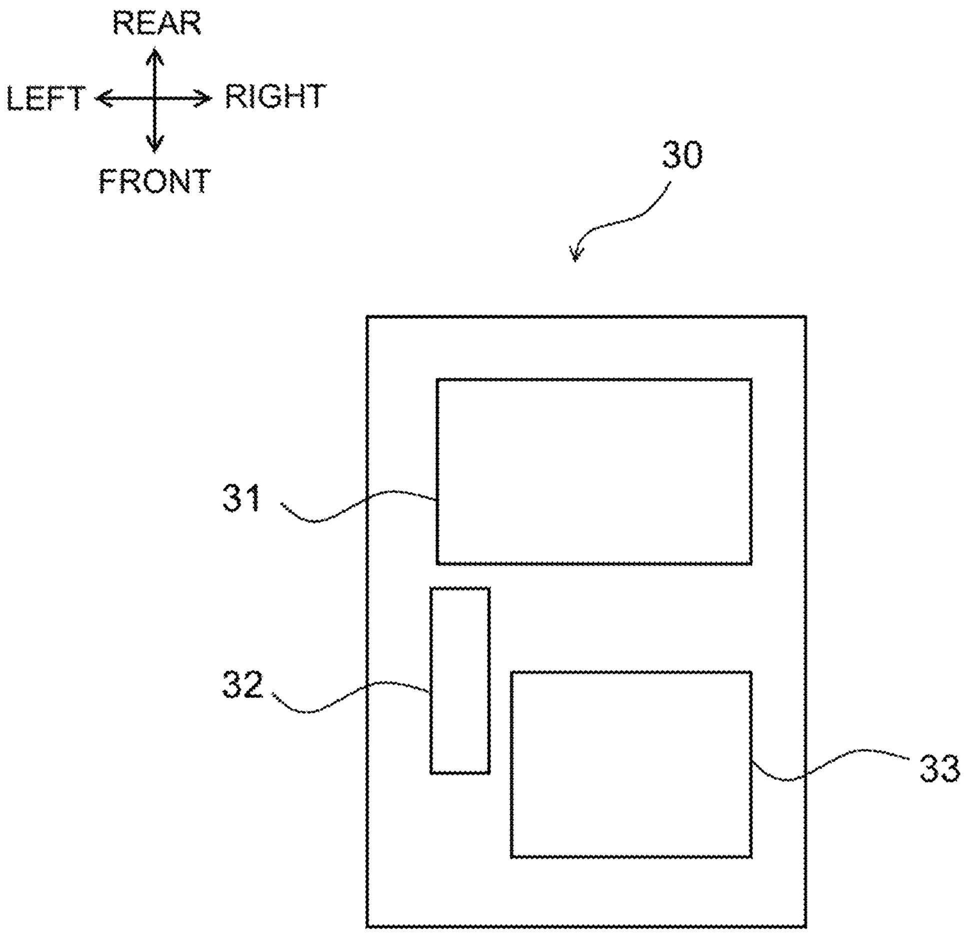
FIG. 12 is a diagram that illustrates an example of another configuration of a head unit.

The configuration of the head unit is not limited to the configurations of the head units 10 and 15 illustrated in FIGS. 3 and 7, and may be the configuration of the head unit 30 illustrated in FIG. 12, for example. The head unit 30 illustrated in FIG. 12 is equipped with a first head 31, a second head 32, and a third head 33.

The first head 31 of the head unit 30 is the same as the first head 16 of the head unit 15 of the second embodiment. In the head unit 15 of the second embodiment, the second head 17 and the third head 18 are arranged in the left to right direction (the moving direction of the head unit 10) and are aligned at the same position in the front to rear direction (the conveyance direction of the print medium P). However, in the head unit 30, the second head 32 and the third head 33 are arranged so as to be offset from each other in the front to rear direction.

The configuration and function of the second head 32 are the same as those of the second head 17 of the second embodiment, and the second head 32 ejects the treatment agent onto the print medium P. Further, the configuration and function of the third head 33 are the same as those of the third head 18 of the second embodiment, and the third head 33 performs the second ink ejecting operation.

Figure 13:
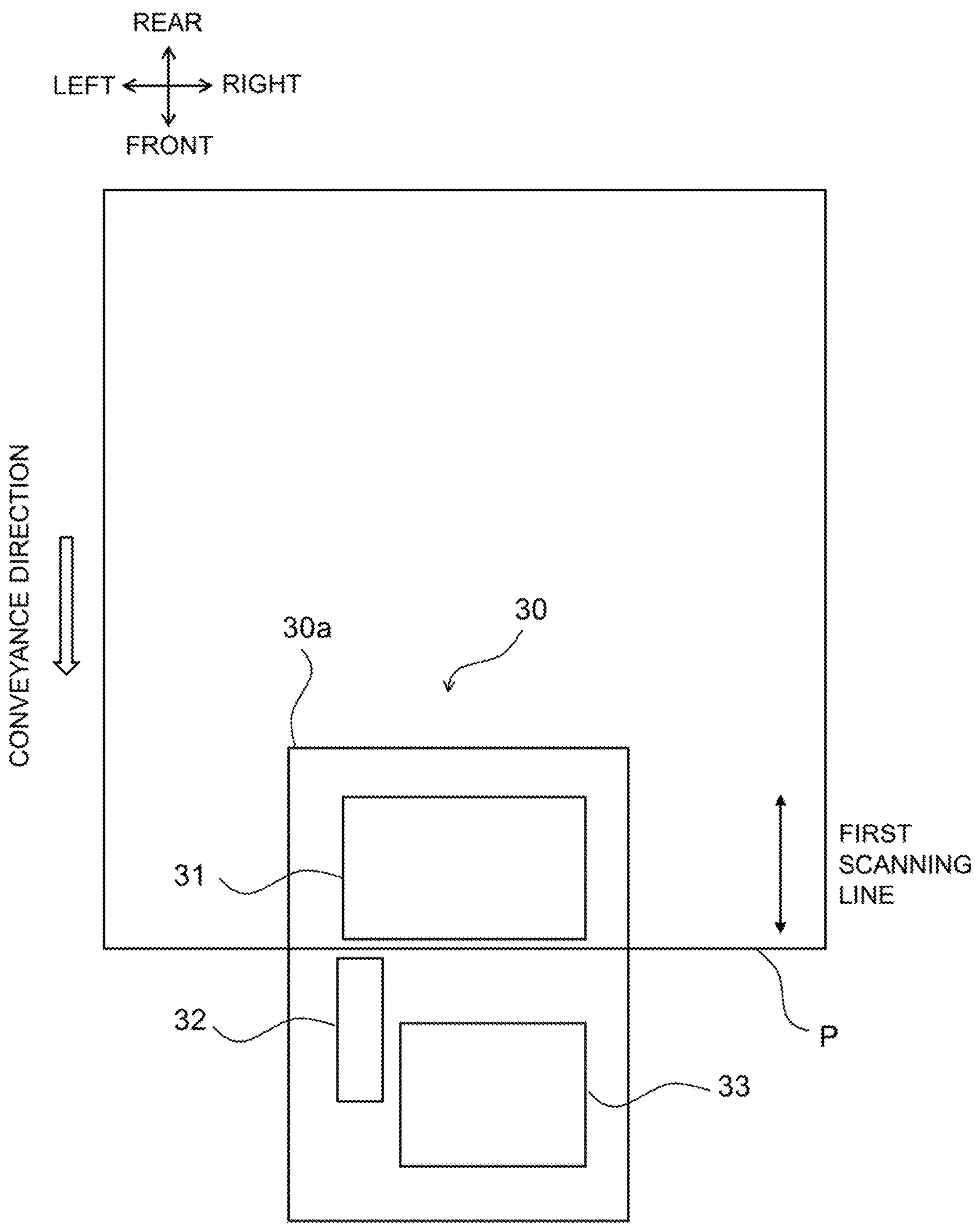
FIG. 13 is a diagram for explaining a printing operation using the head unit illustrated in FIG. 12.
Figure 14:
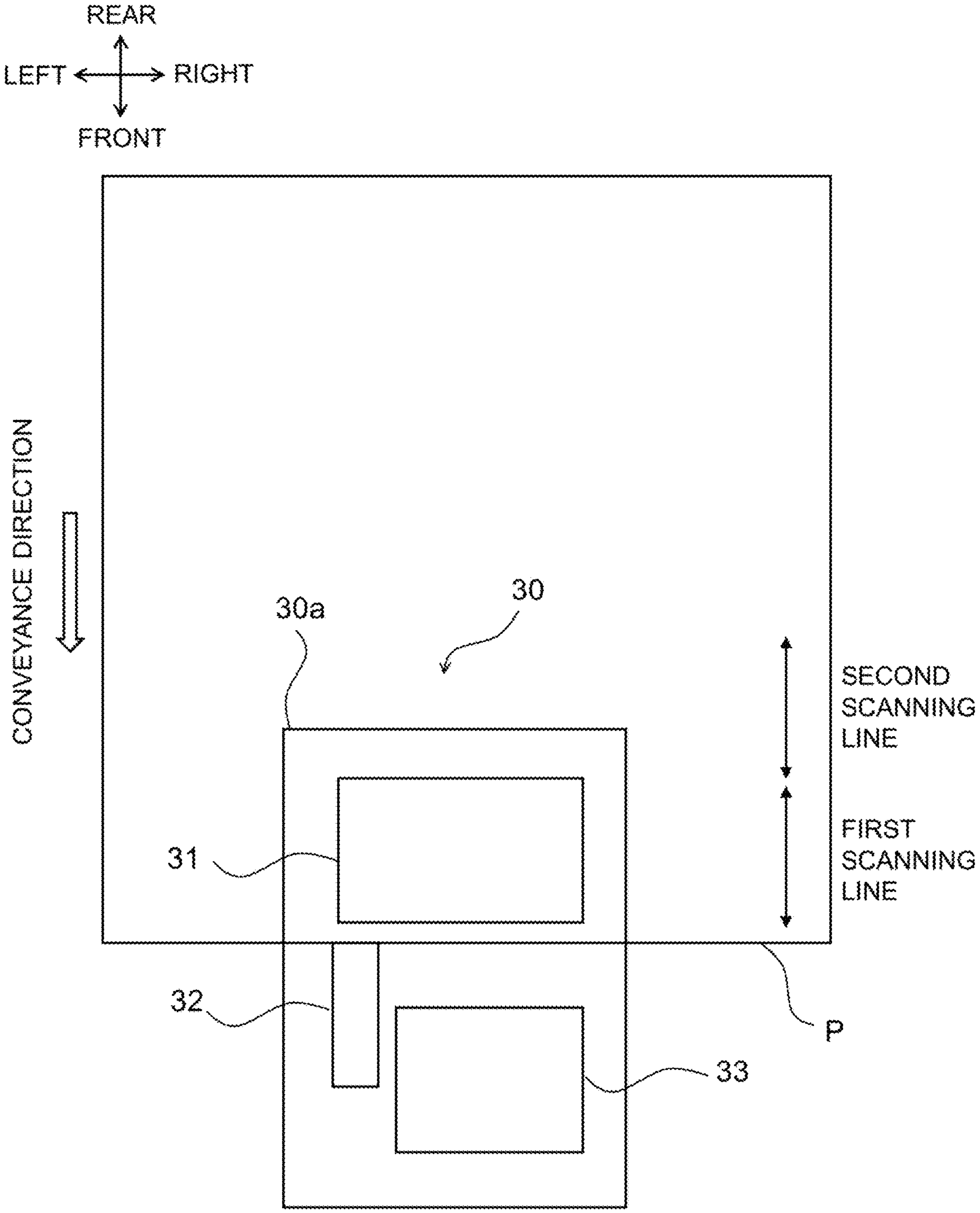
FIG. 14 is a diagram for explaining a printing operation using the head unit illustrated in FIG. 12.

In the case that a printed image is to be formed using the head unit 30 illustrated in FIG. 12, the second head 32 initiates ejection of the treatment agent at a point in time after the first ink ejection to a first scanning line is completed by the first head 31 and the print medium P has reached the position indicated in FIG. 14, as illustrated in FIG. 13, to initiate ejection of the treatment agent onto the first scanning line is initiated. In addition, a first ink ejection operation onto a second scanning line that follows the first scanning line is initiated by initiating the first ink ejection operation from the first head 31.

Note that in the case that the head unit 30 illustrated in FIG. 12 is employed, neither the ink nor the treatment agent is not ejected from all the nozzles which are arranged in the front to rear direction, but the ink or the processing is ejected only from nozzles corresponding to a printing region, in the same manner as for each single movement of the head units 10 and 15 according to the first and second embodiments.

Figure 15:
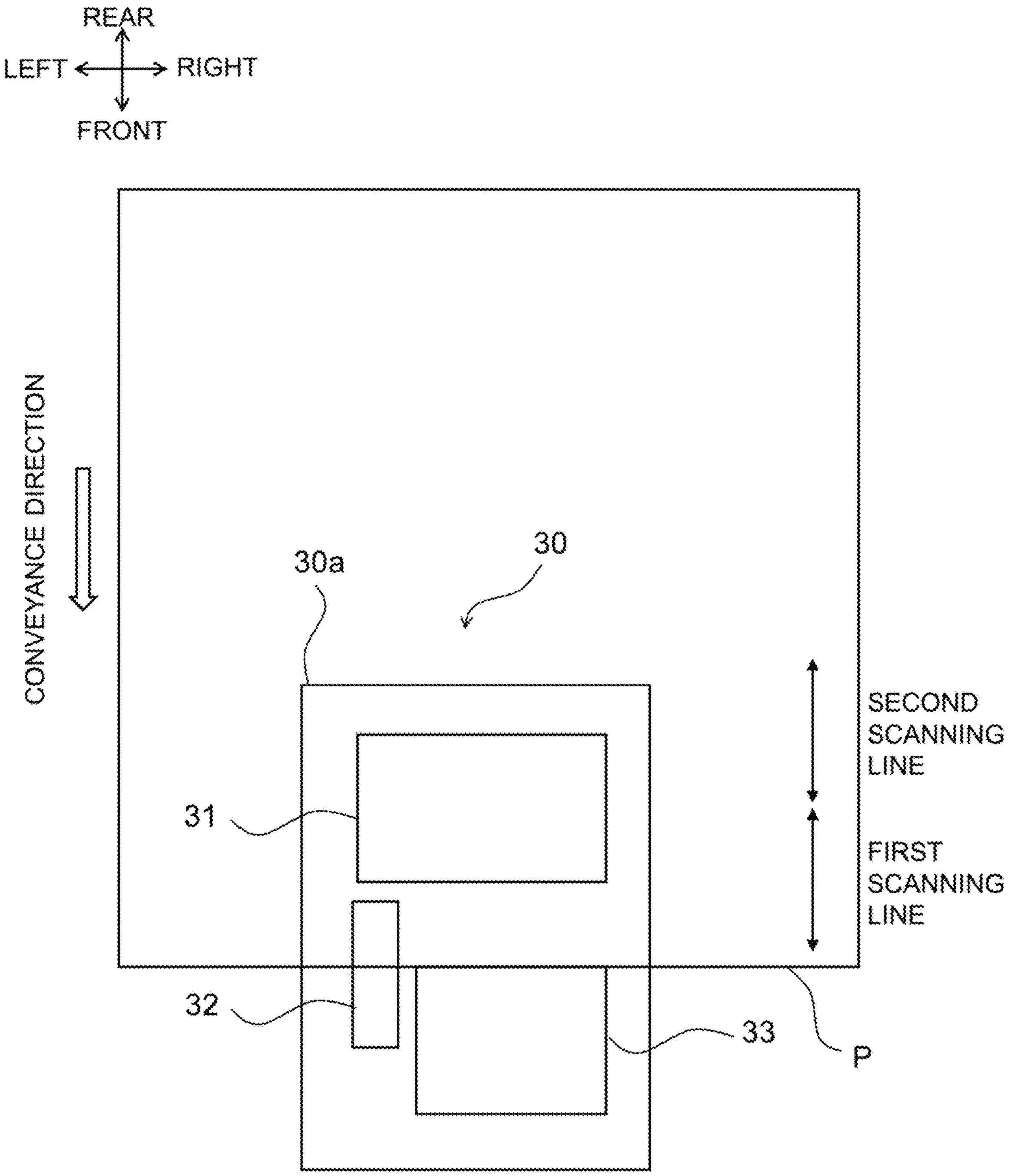
FIG. 15 is a diagram for explaining a printing operation using the head unit illustrated in FIG. 12.
Figure 16:
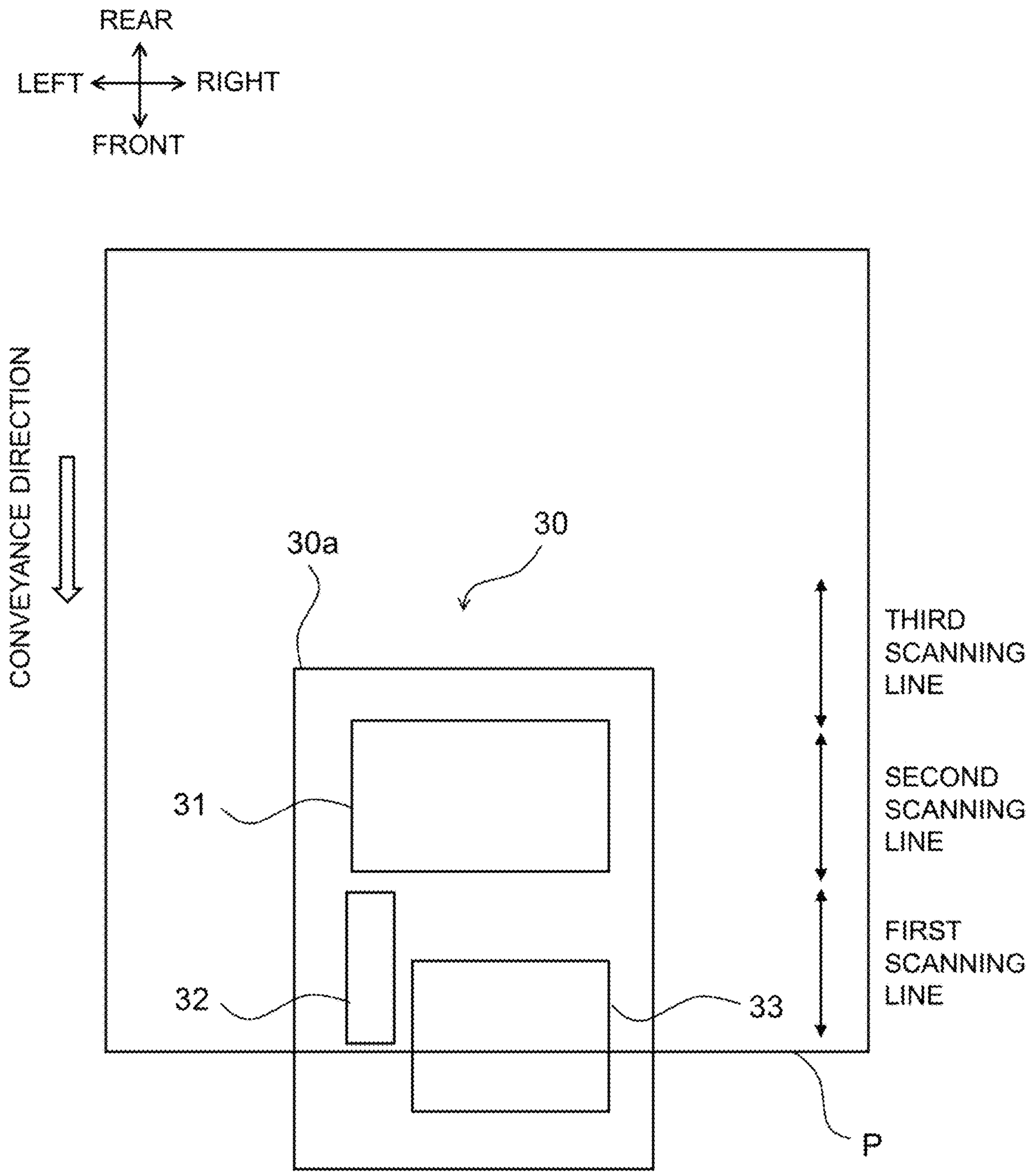
FIG. 16 is a diagram for explaining a printing operation using the head unit illustrated in FIG. 12.

Then, the second ink ejecting operation from the third head 33 is initiated when the print medium P reaches the position indicated in FIG. 15. Thereby, the second ink ejection onto the first scanning line is initiated. Then, by ejecting the treatment agent from the second head 32 until the print medium P reaches the position indicated in FIG. 16, the treatment agent ejecting operation onto the first scanning line is completed. In addition, the first ink ejecting operation onto the second scanning line by the first head 31 is completed at this time. Further, the first ink ejecting operation by the first head 31 onto the third scanning line that follows the second scanning line is initiated.

Figure 17:
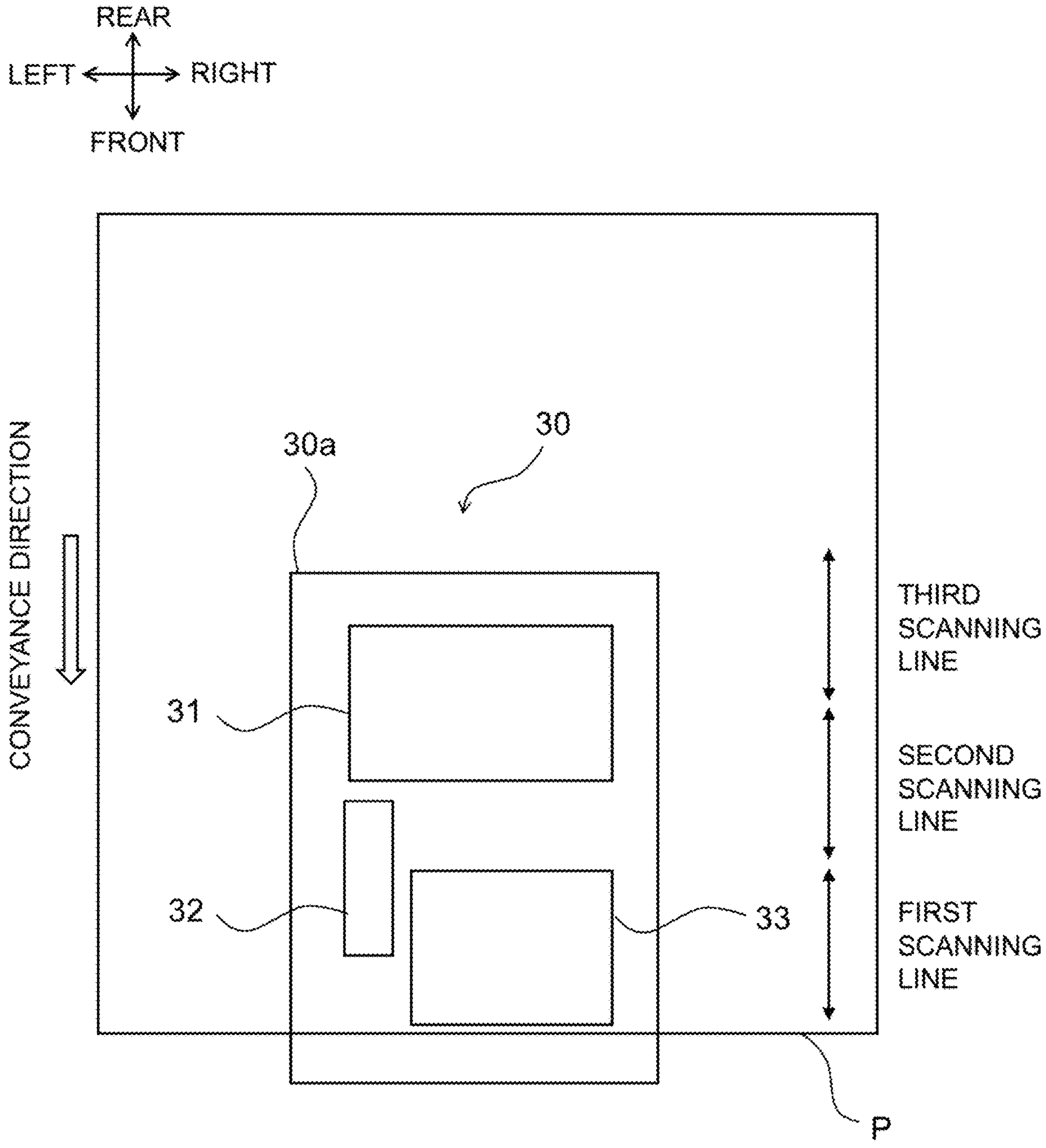
FIG. 17 is a diagram for explaining a printing operation using the head unit illustrated in FIG. 12.

Next, printing on the first scanning line is completed by initiating the second ink ejecting operation from the third head 33 until a point in time at which the print medium P reaches the position indicated in FIG. 17.

Thereafter, the first ink ejecting operation, the treatment agent ejecting operation, and the second ink ejecting operation are sequentially performed on predetermined scanning lines by alternately repeating feed out of the print medium P and movement of the head unit 30 in the first and second directions, in the same manner as that described above.

Figure 18:
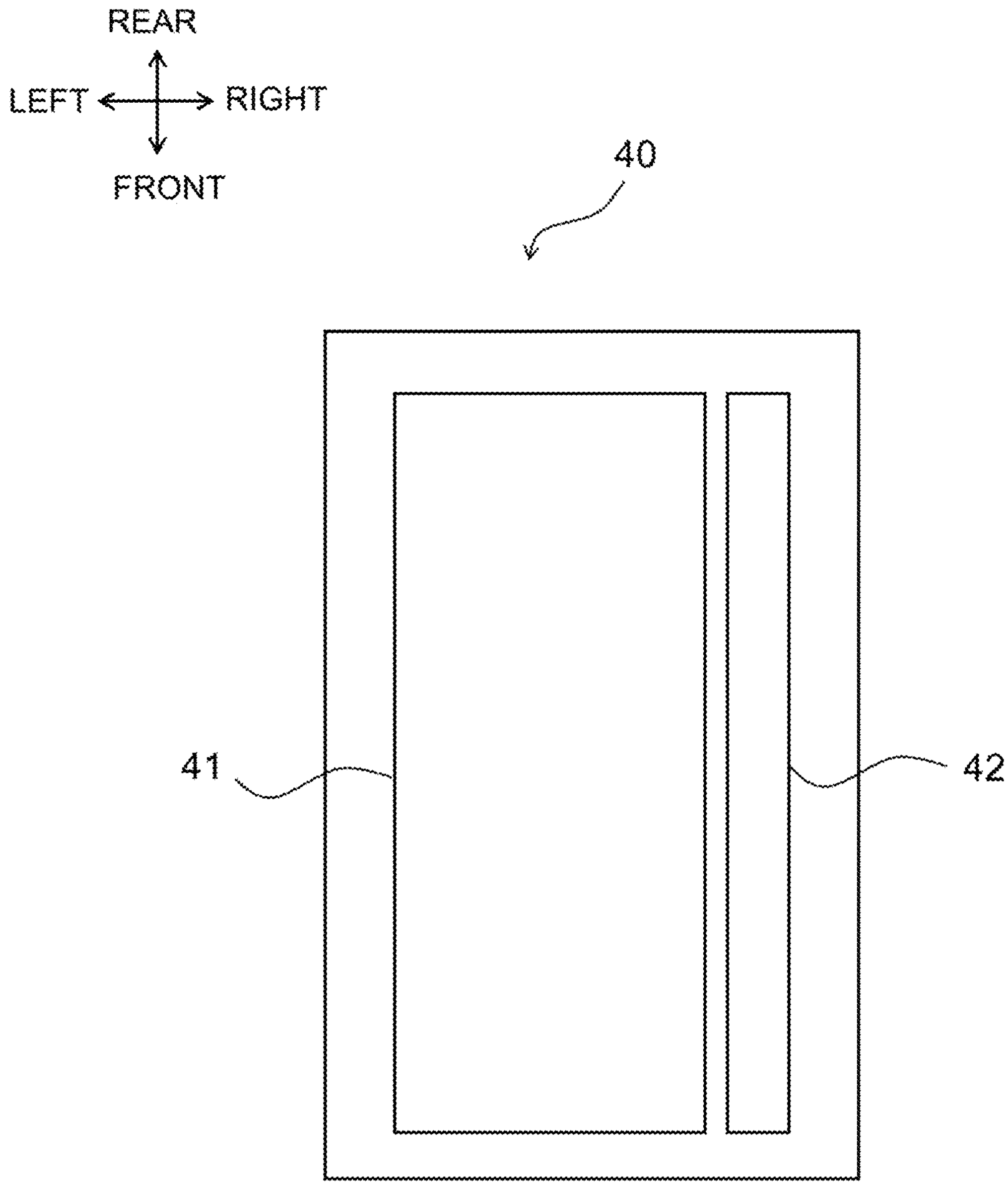
FIG. 18 is a diagram that illustrates an example of another configuration of a head unit.
Figure 19:
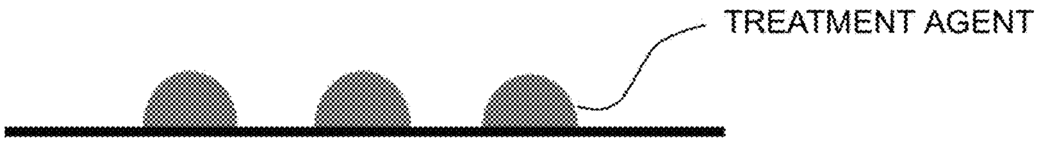
FIG. 19 is a diagram illustrates an example in which droplets of a treatment agent are formed.
Figure 20:
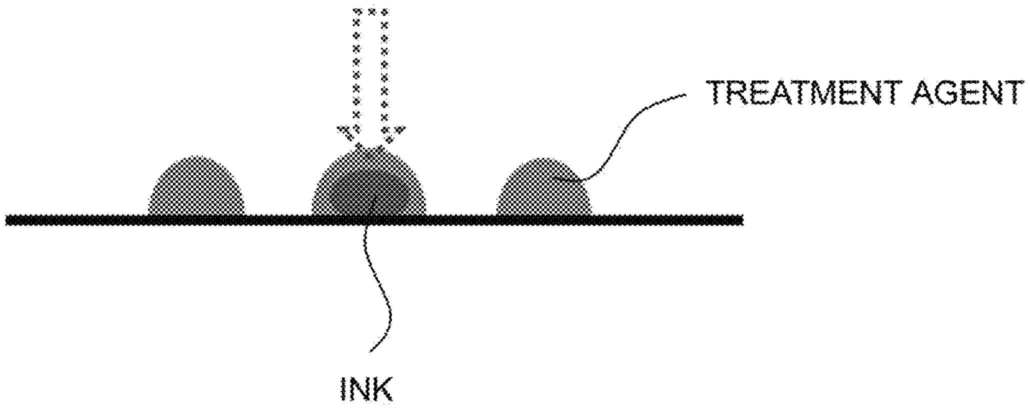
FIG. 20 is a diagram for explaining ink aggregation when ink lands on droplets of a treatment agent.
Figure 21:
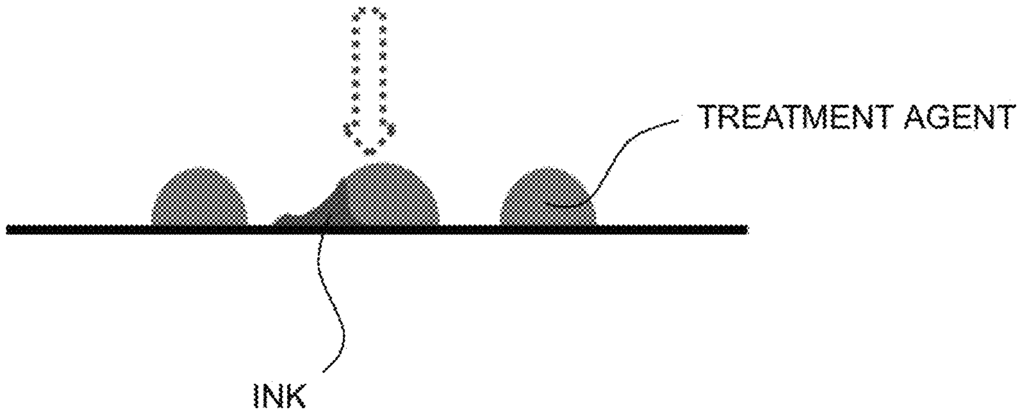
FIG. 21 is a diagram for explaining the displacement of the landing positions of ink dots in the case that ink lands on a droplet of a treatment agent.
Figure 22:
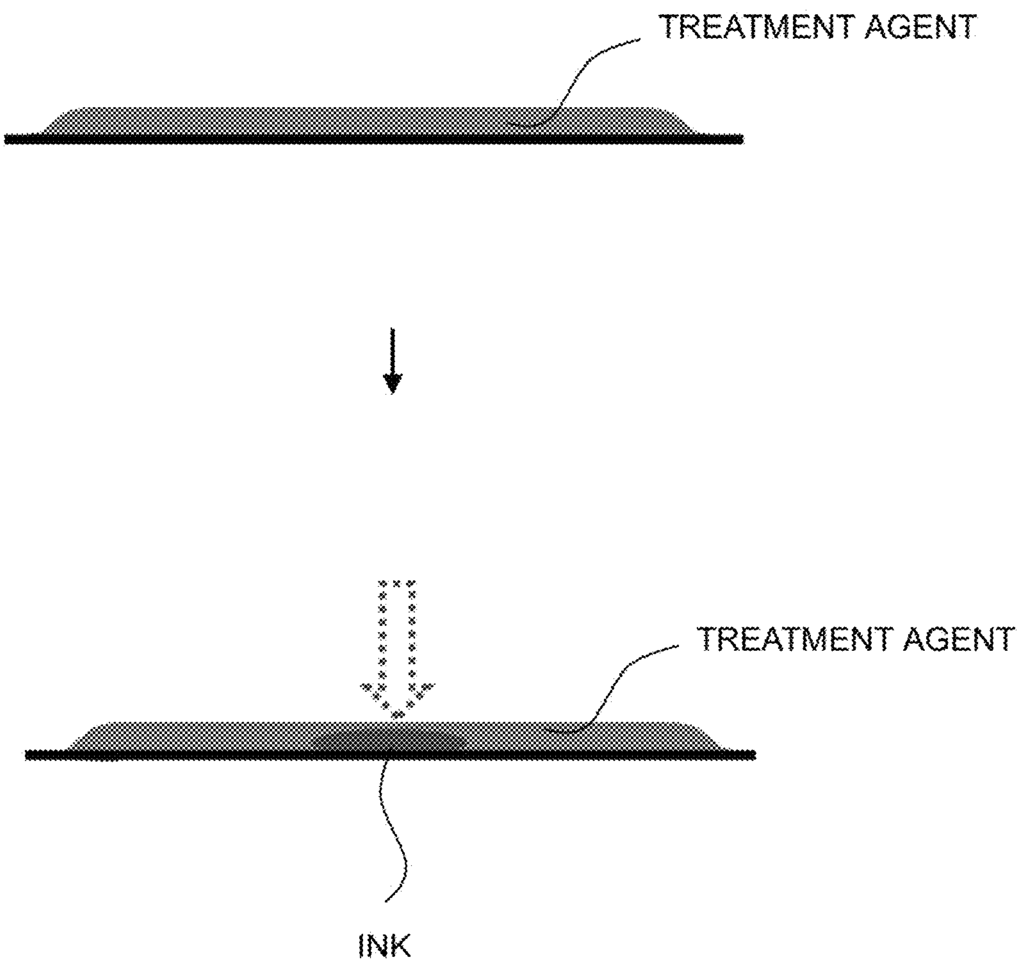
FIG. 22 is a diagram that illustrates how a treatment agent gets wet and spreads.

Note that it is not necessary for the inkjet head that performs the first ink ejecting operation and the inkjet head for preforming the second ink ejecting operation to be provided separately. For example, a head unit 40 may be constituted by a first head 41 that ejects ink and a second head 42 that ejects the treatment agent, illustrated in FIG. 18. In the case that such a configuration is adopted, the nozzles for ejecting ink from the first head 41 and the nozzles for ejecting the treatment agent from the second head 42 may be selectively controlled, such that the same printing results as those obtained by the head units 10, 15, and 30 can be obtained.

In addition, in the description above, the treatment agent is ejected from the second heads which are similar to the inkjet heads. However, but the method for coating the treatment agent is not limited to such a configuration, and other coating methods such as spray coating may be employed

Example 1

Hereinafter, Examples of the present invention will be described in greater detail. However, the present invention is not limited to these Examples.

Examples 1 to 5 shown in Table 1 are examples in which a printed image is formed by using the inkjet printing apparatus.

TABLE 1

| | | Example 1 | Example 2 | Example 3 | Example 4 | Example 5 |
|---|---|---|---|---|---|---|
| 1st Ink Ejection | Performed? | Yes | Yes | Yes | Yes | Yes |
| | Printing Rate Threshold Value | 40% | 35% | 30% | 25% | 20% |
| Treatment agent Ejection | Performed? | Yes | Yes | Yes | Yes | Yes |
| 2nd Ink Ejection | Performed? | Yes | Yes | Yes | Yes | Yes |
| | Printing Rate Threshold Value | 60% | 65% | 70% | 75% | 80% |
| Solid Filling Property | | A | A | A | A | B |
| | | Comparative Example 1 | | Comparative Example 2 | | Comparative Example 3 |
| 1st Ink Ejection | Performed? | Yes | | Yes | | No |
| | Printing Rate Threshold Value | 40% | | 100% | | 0% |
| Treatment agent Ejection | Performed? | No | | No | | Yes |
| 2nd Ink Ejection | Performed? | Yes | | No | | Yes |
| | Remaining Printing Rate | 60% | | 0% | | 100% |
| Solid Filling Property | | C | | C | | C |

A water based pigment ink of the color K (black) was employed as the ink in the evaluations of Table 1 above, each of the components shown in Table 2 below was premixed at the ratios (in converted solid content) shown in Table 2, and the ink was obtained by passing the obtained mixed liquid through a membrane filter having a pore size of 3 μm.

The details of the raw materials shown in Table 2 are as follows.

"CAB-O-JET 200": Water based self dispersing black pigment dispersion, produced by Cabot, Co.

"Takelac W-5661": Poly urethane dispersion, produced by Mitsui Chemicals, Inc.

"Silface SAG002": Silicone based surfactant produced by Nissin Chemical Industries Co., Ltd.

TABLE 2

| Ink Color | | Black |
|---|---|---|
| Pigment Dispersion | CAB-O-Jet | 6 |
| Water Dispersive Polymer | Takelac W-5661 | 2.3 |
| Surfactant | Silface SAG002 | 3 |
| Water Soluble Organic Solvent | Glycerin | 20 |
| Water | | 68.7 |
| Total | | 100 |

A treatment agent that contains a water soluble cationic polymer was used as the treatment agent.

The treatment agent which was employed in the evaluations of Table 1 above was obtained by premixing each of the components shown in Table 3 below at the ratios shown in Table 3 and passing the obtained mixed liquid through a membrane filter having a pore size of 3 μm.

The details of the raw materials listed in Table 3 below are as follows.

"Sharoll DC-303P": produced by Dai-ichi Kogyo Seiyaku Co., Ltd., cationic water soluble polymer, amount of active ingredient 41% (poly diallyl dimethyl ammonium chloride)

"Dipropylene Glycol": produced by FUJIFILM Wako Pure Chemical Corporation

"1,2-Butanediol": produced by Tokyo Chemical Industry Co., Ltd.

"Silface SAG002": Silicone based surfactant produced by Nissin Chemical Industry Co.,

TABLE 3

| Product Name/Name of Chemical | Ratio (weight %) |
|---|---|
| Sharoll DC-303P | 17.1 |
| Dipropylene Glycol | 5.0 |
| 1,2-Butanediol | 5.0 |
| Silface SAG002 | 1.0 |
| Ion Exchanged Water | 71.9 |
| Total | 100 |

A white vinyl chloride film was employed as the print medium.

Black solid images were formed as the printed images. The dot density of the printed black ink was 600 dpi×1200 dpi (the dot density when the target printing rate was 100%).

The printed images were formed using the inkjet printing apparatus 1 according to the first embodiment, the printed images were dried at 100° C. for 1 minute using a warm air heater, and then the solid filling property of each printed image was evaluated. The solid filling property is higher as the wetting and spreading properties of the ink are higher, the ink landing accuracy is higher, and the closer the dot shape of the ink is to a perfect circle.

The solid filling property was evaluated by visually observing the printed images from a distance of 30 cm. The printed images were evaluated as "A" in the case that white spots (portions at which the white vinyl chloride film is not colored) were at a level that could not be confirmed as being present at all, "B" in the case that white spots were at a level that could be confirmed as being present, and "C" in the case that white spots were at a level where white spots were conspicuous or white streaks were generated.

The threshold values of the printing rate of the first ink ejecting operation and whether the treatment agent was ejected are as shown in Table 1. As shown for Examples 1 through 4, the evaluations of solid filling property were "A"

in cases in which the printing rate of the first ink ejection was 25% to 40%. In addition, as shown for Example 5, in the case that the printing rate of the first ink ejection is 20%, the printing rate of the first ink ejecting operation is lower than those of Examples 1 to 4. Therefore, the number of dots to secure a sufficient dot size, the number of dots that landed near the target position, and the number of dots which are of shapes close to a perfect circle are smaller than those of Examples 1 to 4. As a result, the evaluation of the solid filling property for Example 5 was “B”.

Comparative Example 1 shown in Table 1 is a case in which a printed image is formed by ejecting ink in two steps without a treatment agent, and Comparative Example 2 is a case where ink is ejected only once without a treatment agent, and Comparative Example 3 is a case in which the printed image is formed by first ejecting the treatment agent and then ejecting ink only once. The evaluations of the solid filing property for Comparative Examples 1 through 3 were “C”. In Comparative Example 1 and Comparative Example 2, the treatment agent was not employed, the ink dots were not fixed, and the ink dots moved and coalesced, resulting in the solid filling properties thereof deteriorating to a degree that enabled the white color of the medium itself to be seen. In Comparative Example 3, the treatment agent was ejected first and then the ink was ejected. Therefore, the treatment agent was present on the print medium P first, and ink that landed in the vicinity of the treatment agent could not obtain sufficient dot size. In addition, the landing positions of the ink deviated from target landing positions due to the presence of the treatment agent, and the dot shape of the ink became distorted, resulting in the solid filling property deteriorating.

Next, Examples 6 to 11 shown in Table 4 below are examples in which a printed image is formed by using the inkjet printing apparatus 1 according to the second embodiment. That is, these are examples of cases in which the timing of the treatment agent ejecting operation and the timing of the second ink ejecting operation are during the same period of time.

operation was 40% and 35%, the evaluations of the solid filling property were “B”. That is, in Examples 6 and 7, the evaluations of solid filling property evaluation were slightly deteriorated as compared with Examples 1 and 2, which had the same threshold values for the printing rate of the first ink ejecting operation. This is because in Examples 6 and 7 the treatment agent and the ink are simultaneously ejected in a state in which the printing rate of the first ink ejection is as high as 40% and 35%, resulting in the ink ejected during the second ink ejecting operation is ejected onto regions where the treatment agent is not sufficiently present (because regions having a printing rate of 50% or greater as illustrated in FIG. 5 are locally generated), there are portions in which the coalescence of dots cannot be suppressed. It is considered that the effect of improving the solid filling property by the two step ink ejection control is reduced for this reason.

As shown for Examples 8 through 10, in the case that the printing rates of the first ink ejecting operation were 20% to 30%, the evaluations of the solid filling property were “A”. In Examples 8 through 10, because the treatment agent and the ink are ejected at the same time in a state where the printing rate of the first ink ejection is lower than that of Examples 6 and 7, the treatment agent exhibits a sufficient coalescence suppressing effect before the coalescence of ink progresses. It is considered that the solid filling property evaluation is improved because the treatment agent exerts a sufficient coalescence suppressing effect (because there is a margin before regions having a printing rate of 50% or greater as illustrated in FIG. 5 are generated).

However, as shown for Example 11, in the case that the printing rate of the first ink ejecting operation is 15%, the printing rate of the first ink ejecting operation is low. Therefore, the number of dots to secure a sufficient dot size, the number of dots that landed near the target position, and the number of dots which are of shapes close to a perfect circle are smaller than those of Examples 8 through 10. As a result, the evaluation of the solid filling property for Example 11 was “B”.

TABLE 4

| | | Example 6 | Example 7 | Example 8 | Example 9 | Example 10 | Example 11 |
|---|---|---|---|---|---|---|---|
| First Ink Ejection | Performed? | Yes | Yes | Yes | Yes | Yes | Yes |
| | Printing Rate Threshold Value | 40% | 35% | 30% | 25% | 20% | 15% |
| Treatment agent and Ejection | Performed? | Yes | Yes | Yes | Yes | Yes | Yes |
| | Temporal Interval between Treatment agent Ejection Timing and Second Ink Ejection Timing | 0 seconds (Same Time) | 0 seconds (Same Time) | 0 seconds (Same Time) | 0 seconds (Same Time) | 0 seconds (Same Time) | 0 seconds (Same Time) |
| Second Ink | Remaining Printing Rate | 60% | 65% | 70% | 75% | 80% | 85% |
| Solid Filling Property | | B | B | A | A | A | B |

The threshold values of the printing rate of the first ink ejecting operation and the whether the treatment agent was ejected are as shown in Table 4. As shown for Examples 6 and 7, in the case that the printing rate of the first ink ejecting As can be seen from Examples 8 through 11, in the case that the timing at which the treatment agent is ejected and the timing at which the second ink ejecting operation is performed are set to be within the same period of time, it became possible to achieve evaluations of the solid filling property of "A" by adjusting the balance between the printing rate of the first ink ejecting operation and the printing rate of the second ink ejecting operation.

Note that in Example 6, in the case that heating was performed during printing, the coalescence of dots was suppressed, resulting in the evaluation of the solid filling property becoming "A". The heating was performed by a heater provided in the printing apparatus, and the heating was performed at 40° C.

The following additional items are further disclosed with respect to the present invention.

(Additional Items)

The ink ejection control apparatus of the present invention is equipped with an ink ejection unit that ejects ink to a print medium to form a printed image, a processing unit that coats the print medium with a treatment agent that contains a coagulant that coagulates ink, and a control unit that performs a two step ink ejection control process to control the ink ejecting unit and the processing unit such that ink is ejected onto the print medium until a printing rate in a predetermined region of the print medium reaches a threshold value which is set in advance, and thereafter coats the treatment agent and ejects ink according to a remaining printing rate during the same period of time.

In addition, the ink ejection control apparatus of the present invention may be equipped with a high printing rate region specifying unit that specifies a high printing rate region in an image to be printed, in which the printing rate is greater than or equal to a preset threshold value, and the control unit may perform two step ink ejection control only with respect to the high printing rate region within the image to be printed.

Further, the ink ejection control apparatus of the present invention may be equipped with a first ink ejecting head that ejects ink prior to the treatment agent being coated, a second ink ejecting head that ejects ink following the treatment agent being coated, and a treatment agent ejecting head for ejecting the treatment agent.

The ink ejection control method of the present invention controls the ejection of ink such that ink is ejected until a preset printing rate in a predetermined region within a print medium reaches a preset threshold value, then a treatment agent that contains a coagulant that coagulates ink is coated on the print medium, and an amount of ink that corresponds to the remaining printing rate is ejected after the treatment agent is coated on the print medium.

What is claimed is:

1. An ink ejection control apparatus, comprising:

an ink ejection unit that ejects ink to a print medium to form a printed image;

a processing unit that coats the print medium with a treatment agent that contains a coagulant that coagulates ink;

and a control unit that performs a two step ink ejection control process to control the ink ejecting unit and the processing unit such that ink is ejected onto the print medium until a printing rate in a predetermined region of the print medium reaches a threshold value which is set in advance, coats the treatment agent thereafter, and then ejects ink according to a remaining printing rate after the treatment agent is coated.

2. The ink ejection control apparatus according to claim 1, further comprising:

a high printing rate region specifying unit that specifies a high printing rate region in an image to be printed, in which the printing rate is greater than or equal to a preset threshold value; and wherein:

the control unit performs two step ink ejection control only with respect to the high printing rate region within the image to be printed.

3. The ink ejection control apparatus according to claim 1, wherein:

the ink ejection unit comprises a first ink ejecting head that ejects ink prior to the treatment agent being coated, a second ink ejecting head that ejects ink following the treatment agent being coated, and a treatment agent ejecting head for ejecting the treatment agent.

4. An ink ejection control apparatus, comprising:

an ink ejection unit that ejects ink to a print medium to form a printed image;

a processing unit that coats the print medium with a treatment agent that contains a coagulant that coagulates ink;

and a control unit that performs a two step ink ejection control process to control the ink ejecting unit and the processing unit such that ink is ejected onto the print medium until a printing rate in a predetermined region of the print medium reaches a threshold value which is set in advance, and thereafter coats the treatment agent and ejects ink according to a remaining printing rate during the same period of time.

5. The ink ejection control apparatus according to claim 4, further comprising:

a high printing rate region specifying unit that specifies a high printing rate region in an image to be printed, in which the printing rate is greater than or equal to a preset threshold value; and wherein:

the control unit performs two step ink ejection control only with respect to the high printing rate region within the image to be printed.

6. The ink ejection control apparatus according to claim 4, wherein:

the ink ejection unit comprises a first ink ejecting head that ejects ink prior to the treatment agent being coated, a second ink ejecting head that ejects ink following the treatment agent being coated, and a treatment agent ejecting head for ejecting the treatment agent.

7. A method for controlling ink ejection, comprising:

controlling the ejection of ink such that:

ink is ejected until a preset printing rate in a predetermined region within a print medium reaches a preset threshold value;

a treatment agent that contains a coagulant that coagulates ink is coated on the print medium; and an amount of ink that corresponds to the remaining printing rate is ejected after the treatment agent is coated on the print medium.

* * * * *